United States Patent [19]
Cohen et al.

[11] Patent Number: 5,740,035
[45] Date of Patent: Apr. 14, 1998

[54] SELF-ADMINISTERED SURVEY SYSTEMS, METHODS AND DEVICES

[75] Inventors: Gerald B. Cohen; Louis W. Conley, both of Gaithersburg; Roberta M. McConochie, Annapolis; Robert H. Patchen, Bethesda; James D. Peacock, Laurel; Claude A. Rankin, Columbia; Thomas W. White, Annapolis, all of Md.

[73] Assignee: Control Data Corporation, Minneapolis, Minn.

[21] Appl. No.: 734,585

[22] Filed: Jul. 23, 1991

[51] Int. Cl.$^6$ .................................................. G06F 159/00
[52] U.S. Cl. ................................................. 364/401 R
[58] Field of Search ............................ 364/401, 406, 364/410; 455/2; 346/20, 21; 434/236; 379/92

[56] References Cited

U.S. PATENT DOCUMENTS

| | | | |
|---|---|---|---|
| 3,199,050 | 12/1976 | Pitroda | 235/152 |
| 3,863,060 | 1/1975 | Rode et al. | 235/156 |
| 4,162,610 | 7/1979 | Levine . | |
| 4,283,709 | 8/1981 | Lueero | 340/147 R |
| 4,355,372 | 10/1982 | Johnson et al. | 364/DIG. 2 |
| 4,542,456 | 9/1985 | Hill | 364/DIG. 1 |
| 4,603,232 | 7/1986 | Kurland et al. | 358/84 X |
| 4,658,290 | 4/1987 | McKenna et al. | 358/84 |
| 4,686,624 | 8/1987 | Blum et al. | 346/20 X |
| 4,718,106 | 1/1988 | Weinblatt | 455/2 |
| 4,764,120 | 8/1988 | Griffen et al. | 434/336 |
| 4,831,526 | 5/1989 | Luchs et al. | 364/401 |
| 4,885,632 | 12/1989 | Mabey et al. | 358/84 |
| 4,905,080 | 2/1990 | Watanabe | 358/84 |
| 4,918,602 | 4/1990 | Bone et al. | 364/401 |
| 4,922,520 | 5/1990 | Bernard et al. | 379/88 |
| 4,954,699 | 9/1990 | Coffey et al. | 235/462 |
| 4,955,070 | 9/1990 | Welsh et al. | 455/2 |
| 5,023,929 | 6/1991 | Call | 455/2 |
| 5,068,787 | 11/1991 | Dipella et al. | 364/406 |
| 5,150,293 | 9/1992 | Murata et al. | 364/419 |
| 5,197,000 | 3/1993 | Vincent | 364/401 |
| 5,214,689 | 5/1993 | O'Sullivan | 379/88 |
| 5,226,177 | 7/1993 | Nickerson | 455/2 |
| 5,245,532 | 9/1993 | Mourier | 364/400 |
| 5,270,920 | 12/1993 | Pearse et al. | 364/401 |

OTHER PUBLICATIONS

Encyclopedia of Computer Science, 3rd ed., Van Nostrand Reinhold Publishers, NY, Ralston et al., p. 534.
Psion PLC, "Organizer II Operating Manual", dated 1989, 62 pages.
The Arbitron Company, "The Electronic Information Log", dated 1988, title page and 16 pages of text James D. Peacock, Research Update, dated Oct. 27, 1988, title page and page 28.
A.J. Aurichio, "Speaker Support Text from The New York Radio and TV Council", dated Oct. 16, 1989 (6 pages), and two sheets including copies of accompanying slides.
The Arbitron Company, "Media Log User's Guide —Radio", 1990, cover, table of contents and 26 pp. of text.
The Arbitron Company, "Media Log User's Guide —Television", 1990, cover, table of contents and 26 pp. of text.
The Arbitron Company, "Media Log User's Guide —Radio and Television", 1990, cover, table of contents and 34 pp. of text.

*Primary Examiner*—Gail O. Hayes
*Attorney, Agent, or Firm*—Curtis, Morris & Safford, P.C.; Eugene L. Flanagan, III

[57] ABSTRACT

Self-administered survey devices include a display, an input device, a memory and a control device which controls the display to show at least one survey question and control the memory to store a response to the at least one question. A system and method for carrying out self-administered surveys utilize a centralized survey data processor and a plurality of self-administered survey devices for storing survey data entered by respective respondents and wherein survey data is wirelessly transmitted from the plurality of self-administered survey devices to the centralized survey data processor.

37 Claims, 22 Drawing Sheets

SELF-ADMINISTERED SURVEY SYSTEMS, METHODS AND DEVICES

BACKGROUND OF THE INVENTION

The present invention relates to self-administered survey systems, methods and devices, and is particularly useful in carrying out surveys of information media experiences, such as television viewing and radio listening.

Two common methods for carrying out television and radio audience surveys are the telephone survey method and the paper diary method. In the telephone survey method, interviewers contact individuals by telephone within a survey area to solicit their participation in the survey. While telephone surveys permit the interviewer to immediately evaluate the completeness of responses, the information requested concerns past events and the respondent's recall of such events may be incorrect or incomplete due to the passage of time.

In contrast to the telephone survey method, in the paper diary method pre-printed diaries are mailed to a large number of survey respondents selected at random within the survey area who are asked to participate by writing down either their television viewing or radio listening on an ongoing basis during a predetermined survey period. The paper diaries are pre-printed in order to logically organize the respondents' answers and guide the respondents in entering the necessary information. The paper diary method, therefore, is designed to promote accurate and complete entries regarding events occurring substantially contemporaneously with the recording thereof and is therefore believed to be superior to the telephone interview method, especially in the case of television and radio media surveys.

A media survey method which requires the respondents to actively record answers in a diary relies on their voluntary, timely and complete entry of viewing or listening information. Advertisers, advertising agencies and broadcasters have in the past expressed concerns that media experiences may not have been fully reported by respondents in their diaries. In particular, it has been inferred from survey data that the media experiences of young children, teens and young men are especially underreported. It is thought by some that such groups are either unable to complete the written diaries or find this task to be particularly tedious and thus neglect to enter complete information.

Another concern is that survey respondents could, at a convenient time, pre-enter viewing or listening information in a paper diary concerning programs which they intend to watch or hear at some time in the future. Since the respondent's actual future experience may well differ from his of her present intentions, the ability to pre-enter data has led those who design and carry out paper diary based surveys to seek improved techniques to restrict this ability.

It is desirable from a statistical standpoint that respondents be chosen at random in the survey area and consequently, the respondents involved in each survey typically differ from those involved in previous surveys. It is, thus, not economically feasible to train survey respondents beforehand to respond in the appropriate manner to the survey questions contained in the diaries. Even where the diaries are arranged with care to facilitate their proper use, it is possible that a number of respondents will not properly understand how to make entries in their diaries. It is thus a further concern that survey respondents must enter survey information in paper diaries without supervision, so that it cannot be known with certainty whether the respondents understood the nature of the information which was sought when they filled in the diaries.

Yet another concern is that a large number of diaries which are sent out are not returned. It is believed that respondents may be discouraged from making written entries during leisure time, since writing is associated by many with tedious tasks such as homework and filling out tax forms. Moreover, since diaries are printed material having virtually no inherent value, some participants may not feel obliged to return them.

The completed diaries are mailed by the respondents to the audience measurement organization which must process the raw data contained in the diaries to provide meaningful information to clients such as advertisers, advertising agencies and broadcasters. It is necessary, therefore, to convert the raw data into machine readable form for data processing. This requires that a relatively large number of written diaries must be interpreted by a large number of human editors who convert the raw data into machine readable form, for example, by key entry. Since a large number of responses must be processed, it is impractical to contact all respondents whose answers are not clearly expressed.

The editors, therefore, are trained to interpret the written diaries in order, where possible, to resolve ambiguities and incomplete entries, and to determine which entries might not be useable for these reasons. It is, therefore, difficult to carry out audience surveys by means of paper diaries without employing a relatively large number of editors to pre-process the raw data in the foregoing manner. The editorial pre-processing step also introduces delays between the generation of the raw data by filling in the diaries and the availability of survey information in a form which is meaningful to end users such as advertisers, advertising agencies and broadcasters.

SUMMARY AND OBJECTS OF THE INVENTION

It is an object of the present invention to provide systems, methods and devices for overcoming the above described shortcomings and disadvantages of prior art paper diaries.

Another object of the present invention is to provide a self-administered survey device which is easy to use in a way which is not perceived by a survey respondent to be tedious.

A further object of the present invention is to provide a self-administered survey device which provides an interactive instructional mode for assisting a survey respondent in learning the proper use of the device.

Still another object of the present invention is to provide a self-administered survey device which automatically supervises the acceptability of data entered by a survey respondent and assists the respondent in entering acceptable data.

A still further object of the present invention is to provide a self-administered survey device which serves to remind a survey respondent to answer previously asked but as yet unanswered questions.

Yet another object of the present invention is to provide a self-administered survey device which inhibits the entry of information by unauthorized persons.

A yet still further object of the present invention is to provide a self-administered survey device permitting a respondent to edit previously entered data.

Another object of the present invention is to provide a self-administered survey device for collecting data concerning events occurring within a survey time period which serves to alert a survey respondent in the absence of a data entry after the passage of a predetermined interval.

Still another object of the present invention is to provide a self-administered survey device capable of providing an information display in a language selectable by a survey respondent.

Yet another object of the present invention is to provide a multi-media self-administered survey device capable of recording media experience data for a plurality of information media.

A still further object of the present invention is to provide a system and method for carrying out self-administered surveys in which survey data stored in a plurality of self-administered survey devices are uploaded to a centralized data processing means in a rapid and efficient manner.

In accordance with a first aspect of the present invention, a self-administered survey device comprises: display means for providing a display of information to a survey respondent; input means for entering survey response data from the respondent; memory means for storing survey response data entered by the input means; control means for controlling the display means to display at least one survey question to the respondent and to control the memory means to store a corresponding response entered by the input means; the control means being operative to determine whether a response received by the input means is within a set of predetermined acceptable responses; the control means being operative upon a determination that an entered response does not fall within the set of predetermined acceptable responses to produce an unacceptable response signal. The present invention in this aspect therefore enables automatic supervision of survey responses to thus improve the likelihood that survey information gathered in this fashion will be accurate and reliable.

In accordance with another aspect of the present invention, a self-administered survey device comprises: display means for providing a display of information to a survey respondent; input means for entering survey response data from the respondent; memory means for storing survey response data entered by the input means; and control means for controlling the display means to display at least one survey question to the respondent, the control means being operative in a first selectable mode of operation to control the memory means to store a corresponding response entered by the input means; the control means being further operative in a second selectable mode of operation to control the display means to display a previously stored response and to cause the memory means to store a response newly entered by the respondent in place of the previously stored response. In this aspect, therefore, the survey respondent is enabled to accurately and unambiguously edit his or her previously stored answers.

In accordance with a further aspect of the present invention, a self-administered survey device for use in conducting multi-media surveys comprises: display means for providing a display of information to a survey respondent; input means for entering survey response data from the survey respondent; memory means for storing survey response data entered by the input means; and control means operative in a first mode for controlling the display means to display at least one survey question regarding one of the respondent's viewing and listening experiences with a first information medium and to control the memory means to store a corresponding first response entered by the input means; the control means being operative in a second mode for controlling the display means to display at least one survey question regarding one of the respondent's viewing and listening experiences with a second information medium and to control the memory means to store a corresponding second response entered by the input means. Accordingly, the present invention in this aspect provides the flexibility for carrying out multi-media surveys in a way which does not confuse survey respondents since a survey to be conducted relative to a respective information medium is carried out in an operating mode appropriate to that medium.

In accordance with still another aspect of the present invention, a self-administered survey device comprises: display means for providing a display of information to a survey respondent; input means for entering survey response data from the respondent; memory means for storing survey response data entered by the input means; and control means for controlling the display means to display at least one survey question to the respondent and to control the memory means to store a corresponding response entered by the input means; the input means being operative to enter at least one command from the respondent for directing the operation of the control means; the control means being operative to carry out at least one further control operation in response to the entry of a command after the display of the at least one survey question and in the absence of a response thereto; the control means being further operative after carrying out the at least one further control operation to control the display means to provide a prompt display to the respondent indicating that the at least one survey question remains unanswered. The present invention in this aspect encourages the entry of complete answers to survey questions even where respondents have neglected initially to enter complete information or where a respondent has caused the device to execute a different operational mode, such as an instructional mode, before completely answering a survey question.

In accordance with a still further aspect of the present invention, a self-administered survey device comprises: display means for providing a display of information to a survey respondent; input means for entering survey response data from the respondent; memory means for storing survey response data entered by the input means; and control means for controlling the display means to display at least one survey question to the respondent and to cause the memory means to store a corresponding response entered by the input means; the input means being operative to enter a password for the respondent; the control means being operative to inhibit storage of the response in the absence of entry of the password by the input means. Accordingly, the invention in this further aspect assists in assuring that only the proper survey respondent who has access to the password will be enabled to enter responses to the survey questions, thus to further assure the relevance and reliability of survey data gathered by means of self-administered survey devices in accordance with the invention.

In accordance with yet still another aspect of the present invention, a self-administered survey device comprises: display means for providing a display of information to a survey respondent; input means for entering survey response data from the respondent; memory means for storing survey response data entered by the input means; control means for controlling the display means to display at least one time-based survey question to the respondent concerning a plurality of possible events occurring at various times within a predetermined survey time period and to control the memory means to store a corresponding response entered by the input means; the control means being operative to produce an alarm signal in the absence of the entry of a response by the respondent after the passage of a predetermined time interval commencing with a most recent response entry; and alarm means for providing an alarm indication perceptible by the respondent in response to the alarm signal. The present invention in this aspect thus promotes the timely entry of survey information to further assist in assuring the accuracy of the reported data.

In accordance with another aspect of the present invention, a self-administered survey device comprises: display means for providing a display of information to a survey respondent; input means for entering survey response data from the respondent; memory means for storing survey response data entered by the input means; and control means for controlling the display means to display at least one survey question to the respondent and to control the memory means to store a corresponding response entered by the input means; the control means being operative to control the display means to display a prompt to the respondent indicating that the respondent should choose one of a plurality of languages for use by the display; the input means being operative to enter a command by the respondent selecting one of the plurality of languages; the control means being operative to control the display means to display the at least one survey question in the language indicated by the command entered by the input means. By providing the capability for carrying out multilingual surveys with the use of a single type of self-administered survey device, the present invention in this aspect provides an efficient means for surveying the population of a given survey area without biasing the results of the survey to reflect responses only from those who happen to speak a given language.

In accordance with yet another aspect of the present invention, a self-administered survey device comprises: display means for providing a display of information to a survey respondent; input means for entering survey response data from the respondent; memory means for storing survey response data entered by the input means; and control means operative in a first selectable mode for controlling the display means to display at least one survey question regarding the respondent's experiences with an information medium and to control the memory means to store a corresponding first response entered by the input means; the control means being operative in a second selectable mode for controlling the display means to provide an interactive tutorial display to the survey respondent including a practice version of the at least one survey question; the control means being further operative to control the memory means to temporarily store practice answers entered by the respondent in response to the practice version of the at least one question. The invention in this aspect thus enables the survey respondent to familiarize himself or herself with the device of the invention in a "hands-on" fashion before actually recording survey data, thus to promote proper operation of the device and consequently further assure the accuracy and completeness of survey data.

In accordance with a still further aspect of the present invention, a system for carrying out self-administered surveys comprises: centralized survey data processing means for processing survey data entered remotely by a plurality of survey respondents; a plurality of self-administered survey means for accepting survey data from respective survey respondents, each of the survey means including wireless data communication means for wirelessly communicating survey data stored therein; and wireless data receiving means for receiving survey data transmitted by the wireless data communication means of a respective one of the plurality of self-administered survey means and providing the received data to the centralized survey data processing means for processing thereby.

In a similar aspect, the present invention provides a method for conducting self-administered surveys, comprising the steps of: providing a centralized survey data processing means for processing survey data entered remotely by a plurality of survey respondents; providing a plurality of self-administered survey means for accepting survey data from respective survey respondents; providing each of the plurality of self-administered survey means to a respective respondent for entering survey data therein; receiving the plurality of self-administered survey means back from the respective survey respondents; and, wirelessly transmitting the survey data entered in the plurality of self-administered survey means to the centralized survey data processing means.

The system and method as aforesaid are relatively easily implemented since it is unnecessary to make and break conductive contact between the wireless data receiving means and each of the plurality of self-administered survey means since data communication takes place wirelessly. It is, therefore, unnecessary to align the various survey means with a required connector in order to establish data communications. Rapid data transfer likewise is facilitated since time is not required to align the devices, nor is it necessary to take the time to make and break connections. It will also be appreciated that wireless data transfer, unlike conductive data transfer techniques, does not result in wear and tear on connectors.

In accordance with another aspect of the present invention, a self-administered survey device for conducting surveys of information medium experiences comprises: display means for providing a display of information to a survey respondent; input means for entering survey response data from a respondent; memory means for storing survey response data entered by the input means; and control means operative in a first mode for controlling the display means to display at least one first question regarding the respondent's experiences with an information medium and for controlling the memory means to store a response to the at least one first question entered with the use of the input means; the control means being operative in a second mode to control the display means to display at least one second question regarding demographic data of the respondent and to control the memory means to store a response to the at least one second question entered with the use of the input means.

In accordance with a further aspect of the present invention, a self-administered survey device comprises: display means for providing a display of information to the survey respondent; input means for entering survey response data from the respondent; memory means for storing survey response data entered by the input means; and control means for controlling the display to provide a sequence of at least two displays, at least one of the two displays providing a survey question to the respondent; the control means being operative to control the memory means to store a response to the survey question entered with the use of the input means; the control means being further operative in response to a change display command entered with the use of the input means while a first one of the at least two displays is provided by the display means to provide a further display indicating that the change display command has been accepted and to subsequently display the other of the at least two displays.

In the preferred implementation of this invention, a processor, such as a CPU, microprocessor, or the like, is programmed to carry out functions mentioned above.

BRIEF DESCRIPTION OF THE DRAWINGS

The following detailed description, given by way of example, and not intended to limit the present invention solely thereto, will best be understood in conjunction with the drawings in which.

DETAILED DESCRIPTION OF PREFERRED EMBODIMENTS

Figure 1:
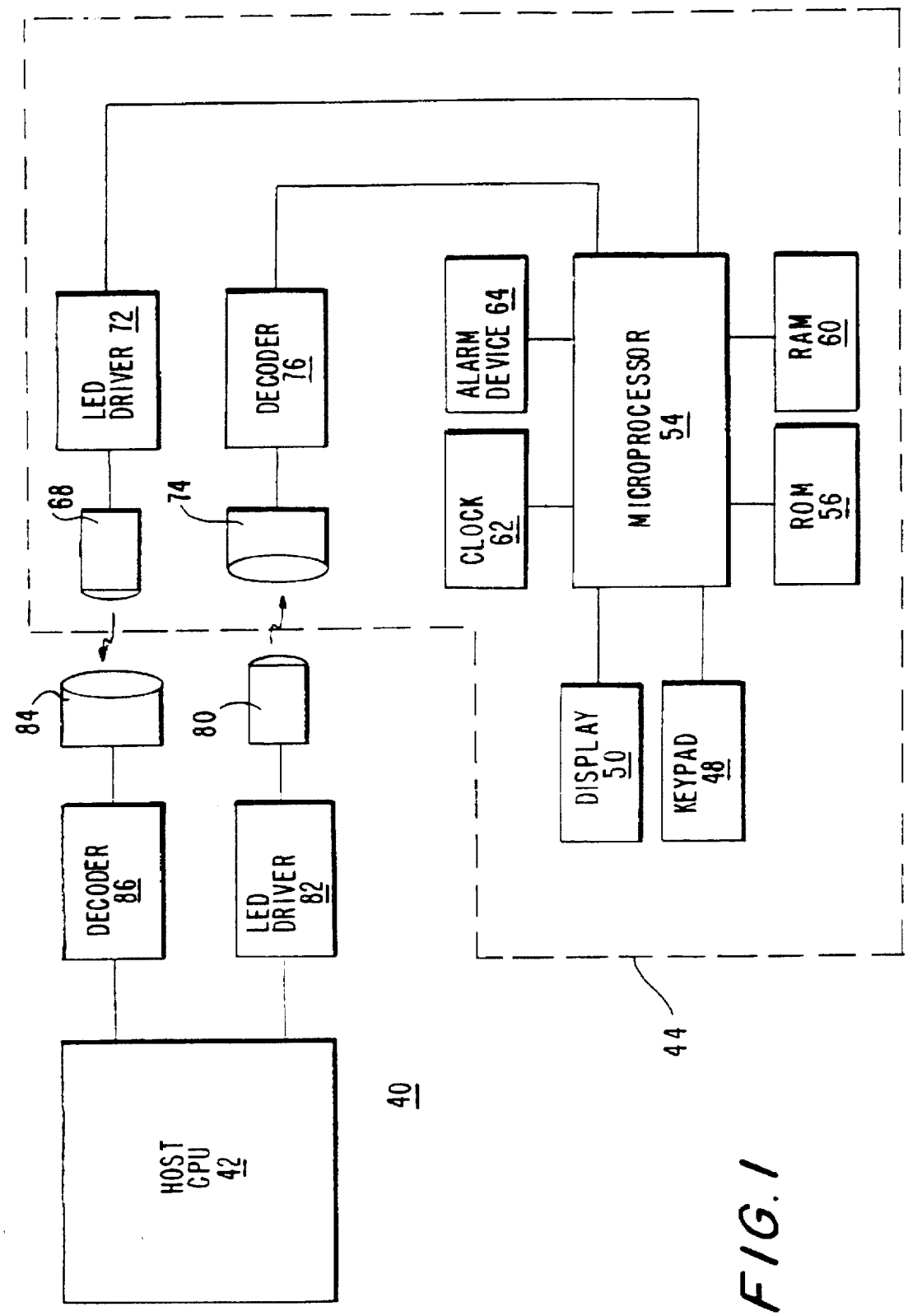
FIG. 1 is an overall functional block diagram of an automated system for carrying out self-administered surveys in accordance with an embodiment of the present invention.

Certain preferred embodiments of the system, device and method of the present invention will now be described in conjunction with the accompanying drawings in which like reference numerals identify corresponding features and elements in the different views thereof.

Referring to the drawings in detail, and presently to FIG. 1 thereof, an embodiment of an automated system 40 for carrying out self-administered surveys concerning information media experience, namely television viewing and/or radio listening, includes a host CPU 42 located at a centralized data processing facility for providing overall system control, as well as for gathering, storing and processing survey data entered remotely by a plurality of survey respondents. The system further includes a plurality of self-administered survey devices 44, one of which is illustrated in FIG. 1 in data communication with the host CPU 42.

Figure 2:
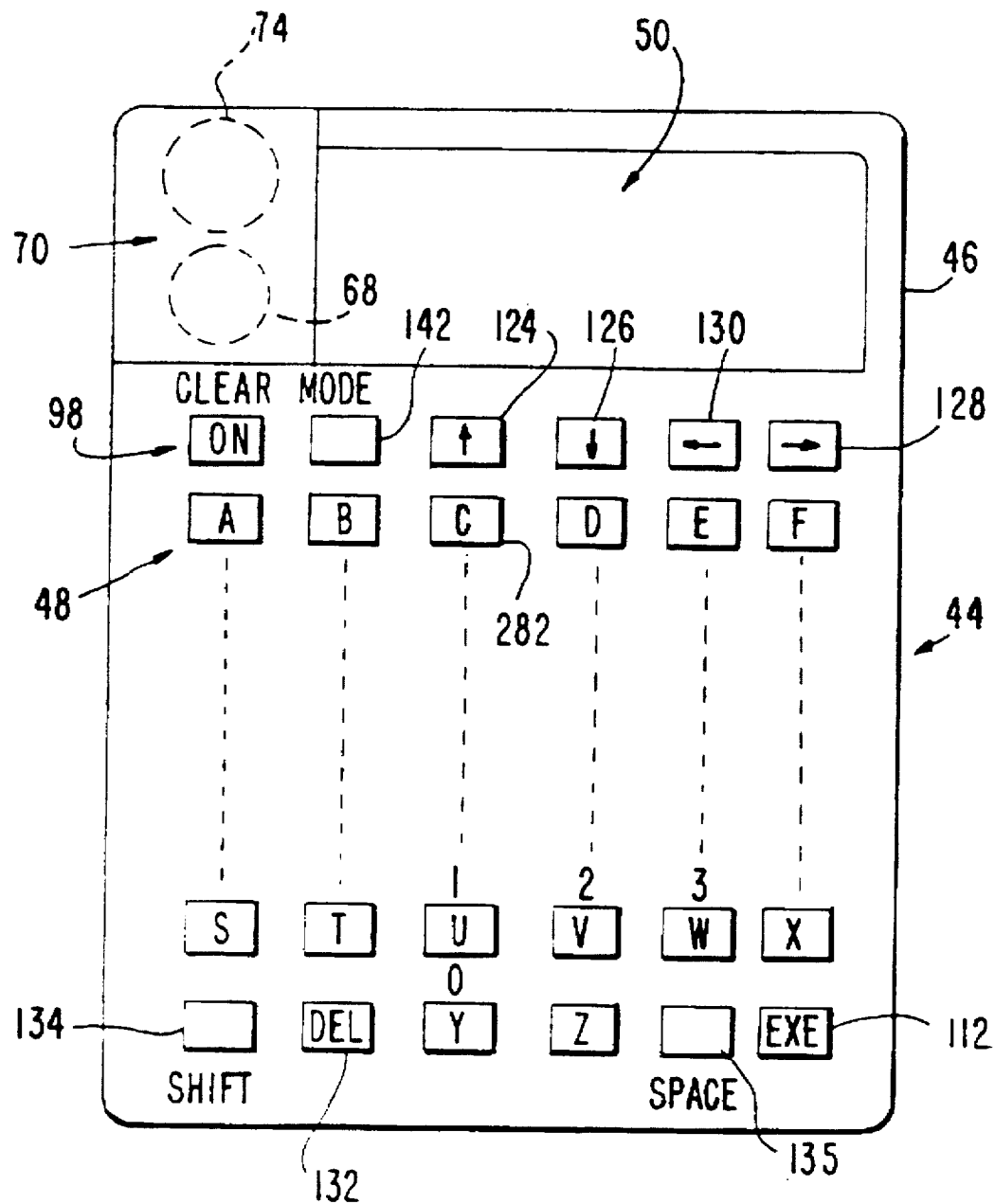
FIG. 2 is a front elevational view of a self-administered survey device in accordance with the embodiment of FIG. 1.

With reference also to FIG. 2, each of the self-administered survey devices 44 includes a case 46 in which various functional elements of the device 44 are enclosed and which is dimensioned to permit a survey respondent to hold the survey device 44 in one hand while entering survey response data by manipulating a keypad data entry device 48 mounted on an exterior front surface of the device 44. It will be appreciated that, in the alternative, various other forms of data input devices may be utilized with the device 44, such as notepad devices and the like. The device 44 also includes an LCD display 50 which serves to provide a visible display of survey questions and responses thereto entered by the survey respondents, as well as instructional information, as set forth in greater detail hereinbelow. It will be appreciated that, in the alternative, other types of displays may be employed in place of the LCD display 50. For example, plasma-type displays and LED displays may also be used for this purpose.

Overall control of the device 44 is exercised by a microprocessor 54 which executes instructions permanently stored in a read only memory (ROM) 56. In the alternative, a PROM, EPROM, EEPROM or the like may be used in place of ROM 56. In accordance with such instructions, the microprocessor 54 communicates display information to the display 50 in order to pose a sequence of survey questions to a survey respondent, display the entered responses and provide instructional information for using the device 44. The microprocessor 54, under the control of the instructions stored in the ROM 56 also serves to control the entry of responses and commands keyed in by the respondent with the use of the keypad 48. As will be seen from the discussion below, the microprocessor 54, by controlling the type and sequence of the questions asked as well as the keys of the key pad 48 to which it will respond determines the acceptability of the responses offered by the survey respondent. In this manner, unambiguous responses are entered and the device 44 is able to pose questions in a logical sequence so that the accuracy and reliability of the responses can be improved as compared with those entered in paper diaries. In addition, the data may thus be entered so that it is pre-formatted for ease of uploading to the host CPU 42. The device 44 also includes a random access memory (RAM) 60 in which the microprocessor 54 stores the response data keyed in by the survey respondent, as well as further data entered prior to a survey time period by the host CPU 42, as described in further detail hereinbelow. It will be appreciated that programming information may also be stored in RAM 60 either in addition to the programming stored in ROM 56 or as an alternative thereto. It will also be appreciated, therefore, that programming information may be downloaded from the CPU 42 to the RAM 60, if desired.

In the embodiment of FIGS. 1 and 2, the ROM 56 and RAM 60 take the form of semiconductor integrated circuits. It will be appreciated that other types of data storage devices such as magnetic, optical and magneto-optic storage media may be employed.

A real time clock 62 serves to provide a signal to the microprocessor 54 representing real or actual time. The microprocessor 54 is operative to reset the real time clock 62 in response to a command communicated thereto by the host CPU 42 in a manner described hereinbelow. The device 44 further includes an audible alarm device 64 which serves to emit an audible alarm in response to a control signal from the microprocessor 54 to alert the survey respondent that no television or radio usage-type entries have been made within a predetermined time interval occurring during a predetermined survey time period.

The device 44 also includes a wireless data communication subsystem for communicating survey data stored in the RAM 60 to the host CPU 42 and for receiving programming information from the host CPU 42 to be stored in the RAM 60 for uniquely identifying the particular survey respondent to whom the device 44 will be sent for conducting a survey and for storing additional control information specific to the time period for which the survey will be conducted, as well as the respondent's location. The data communication subsystem also receives commands from the host CPU 42 which enable the microprocessor 54 to set the real time clock 62 to the actual time at the location of the intended survey respondent.

The transmission subsystem includes an infra-red light emitting diode (LED) 68 operative to emit near infra-red wave length radiation. As illustrated in FIG. 2, LED 68 is mounted within the case 46 to project radiation through an infra-red transmissive cover 70 forming a portion of the outer surface of the case 46. An input terminal of the LED 68 is coupled to an output of an LED driver 72 which selectively energizes the LED 68 in order to modulate its output radiation with transmission data which the LED driver 72 receives from the microprocessor 54 at an input terminal of the driver 72. The transmission system further includes an infra-red receiver 74 mounted within the case 46 beneath the cover 70 to receive infra-red data communication signals generated by the host CPU as explained below and to convert signals into electrical form which it provides at an output coupled with an input of an infra-red data decoder 76. The decoder 76 converts the signals received from the infra-red receiver 74 into a form suitable for input to the microprocessor 54 which responds to the received signals in accordance with instructions included therein by the host CPU 42.

The host CPU 42 is provided with a complementary data transmission subsystem including an infra-red LED 80 having an input coupled with an output of an LED driver 82 which serves to energize the LED 80 to output data communication signals at a near infra-red wavelength. The LED driver 82 has a control input coupled with the host CPU 42 to receive a data modulation signal for modulating the infra-red radiation output by the LED 80 intended for receipt by the infra-red receiver 74 of device 44.

The data transmission subsystem for the host CPU 42 also includes an infra-red receiver 84 for receiving infra-red data transmissions from the LED 68 of the device 44 and converting the received transmissions into an output electrical signal which it provides to an input of an infra-red decoder 86. The decoder 86 serves to provide an input signal to the host CPU 42 corresponding to the signal received from the receiver 84 and converted into a format usable by the CPU 42.

It will be appreciated that the use of the wireless data transmission subsystems of the present embodiment for communicating data between the device 44 and the CPU 42 eliminates the need to effect an electrically conductive contact between the CPU 42 and the device 44 which permits the device 44 to be used repeatedly without mechanical wear and tear caused by the making and breaking of conductive connections. It also eliminates the need to precisely position device 44 for coupling a connector therewith in order to communicate with the CPU 42 so that it is possible to utilize a relatively uncomplicated positioning system for presenting each of the devices 44 to the CPU data transmission subsystem for uploading of survey data and downloading of programming data for the devices 44.

Figure 3:
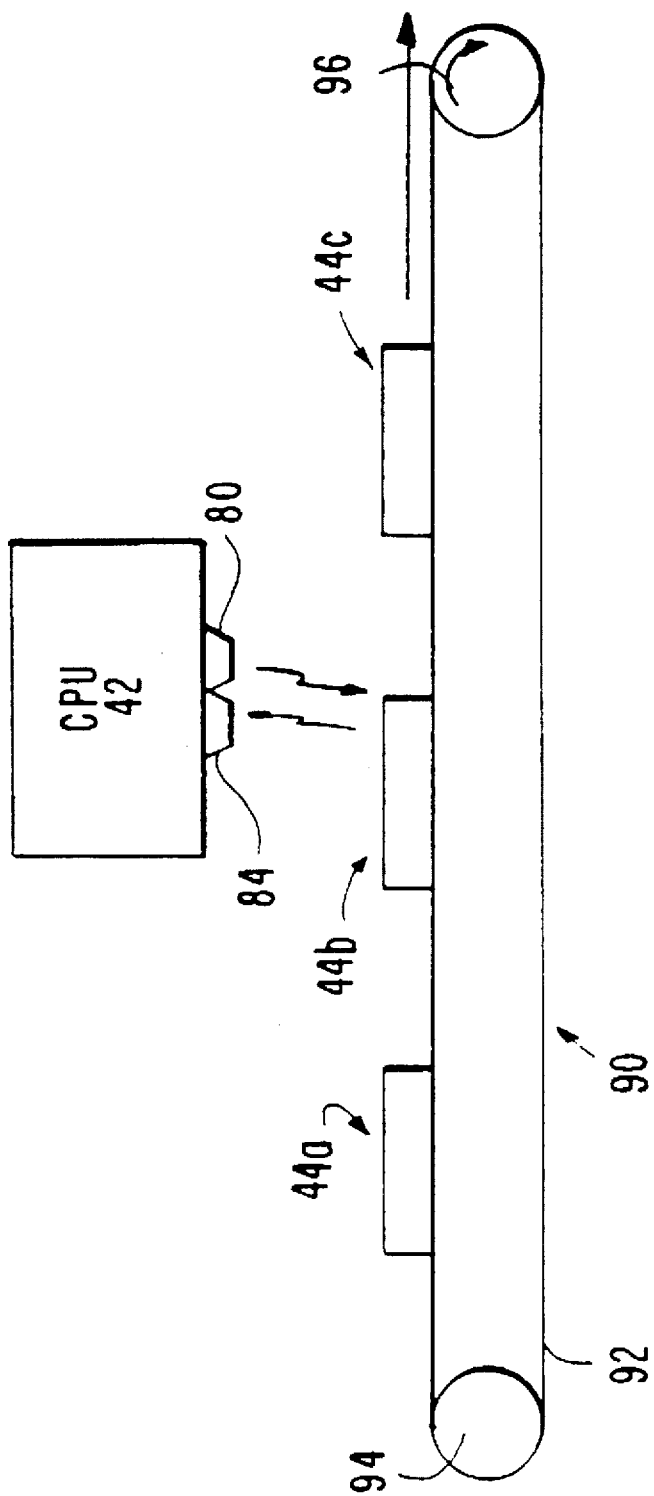
FIG. 3 is a diagrammatic view of a conveyor system for positioning a plurality of self-administered survey devices for data transfer with a centralized data processing unit.

With reference also to FIG. 3, such a mechanical positioning system 40 is shown therein including a conveyor belt 92 driven by a pair of rollers 94 and 96 on which three of the self-administered survey devices 44a, 44b and 44c have been positioned for carrying out data communications with the CPU 42 in sequential fashion. As shown in FIG. 3, the devices which have been returned through the mail by survey respondents are placed on the conveyor belt 90 in the position of the device 44a and are transported by the conveyor belt 92 to the position of the device 44b where data communications with CPU 42 are carried out with the use of the LED 80 and the infra-red receiver 84.

When the CPU 42 thus communicates with the device 44, besides uploading of survey data CPU 42 carries out appropriate diagnostic functions for determining whether the returned device is functioning properly. In the alternative or in addition to diagnostic functions carried out by the CPU 42, CPU 42 may simply command that the device 44 carry out self-diagnostic tests and report back to CPU 42 whether the device 44 is working properly or improperly. In the alternative to the foregoing, or in addition thereto, device 44 may carry out self-diagnostic tests on its own initiative and without the need to communicate with CPU 42. For example, memory check sums may be carried out by device 44 to determine the integrity of its stored data. In that event, the device 44 may be preprogrammed to display a prompt asking that it be returned to the survey organization if a malfunction is detected. In addition CPU 42 uploads the time maintained by the real time clock 62 to determine whether it is accurate, and determines the identity of the corresponding respondent. Assuming it is found to function properly, device 44 is then reprogrammed with the identity of a new respondent, as well as with data indicating a new survey time period and the respondent's geographic area, together with a look-up table of stations and channels which the new respondent should be able to receive in his or her area. The real time clock 42 is also set to the respondent's local time. The reprogrammed devices are then transported to the end of the conveyor belt 92 as in the case of device 44c, after which they are repackaged and mailed each to a respective new respondent using a corresponding mailing label which has been pre-printed under the control of the CPU 42. It will be appreciated that other forms of wireless transmission may also be employed, for example, visible light and even radio frequency energy.

Both the system illustrated in FIGS. 1 and 3 as well as the self-administered survey device of FIGS. 1-3 are useful for carrying out a wide variety of self-administered surveys including market research, political and sociological surveys, as well as public opinion polls. The above-described system and device, as described herein serves to carry out surveys concerning one or more information media, namely television and radio media.

Figure 4A:
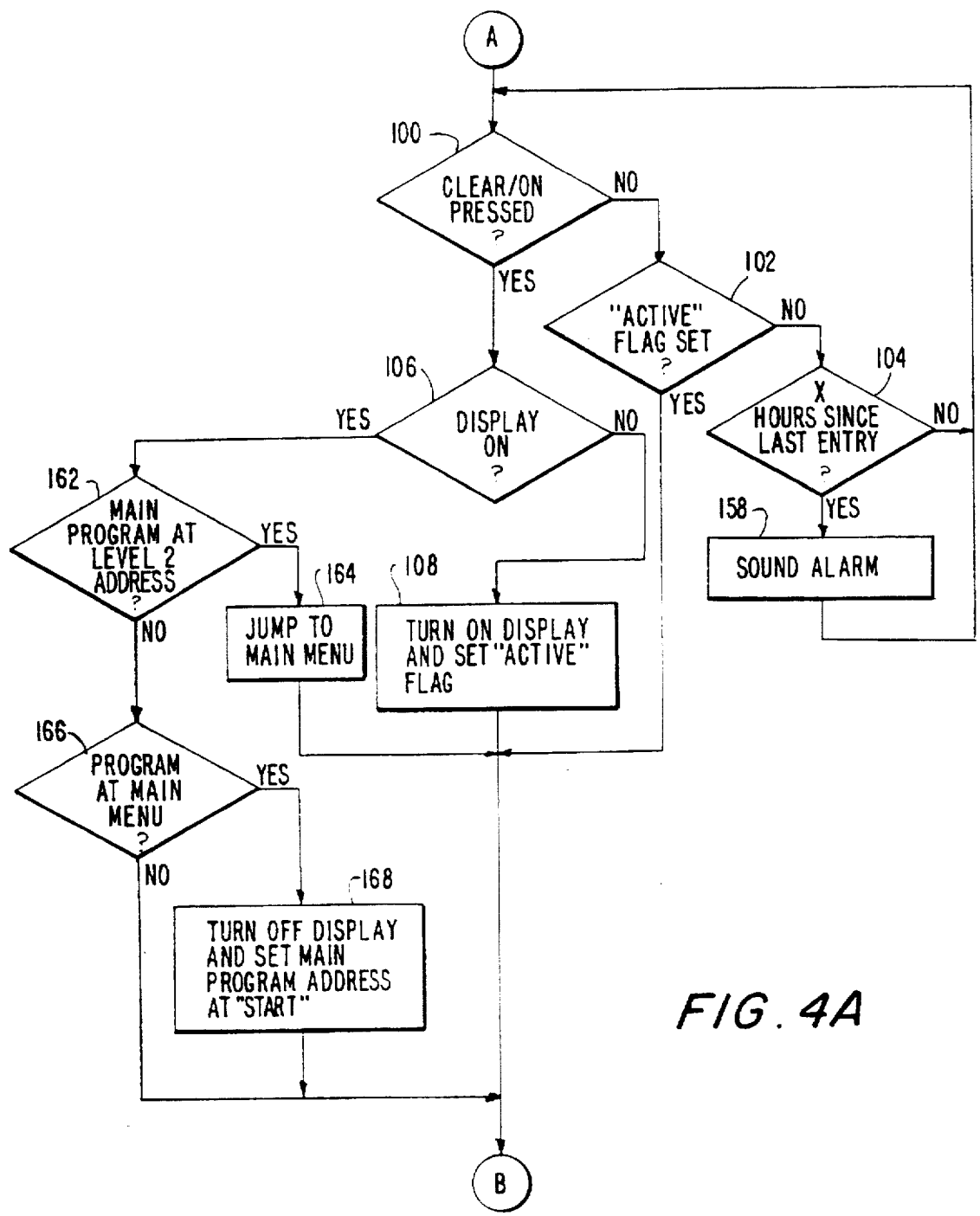
FIGS. 4A through 4C together provide a flow chart for a basic program of the self-administered survey device of FIGS. 1 and 2.
Figure 4B:
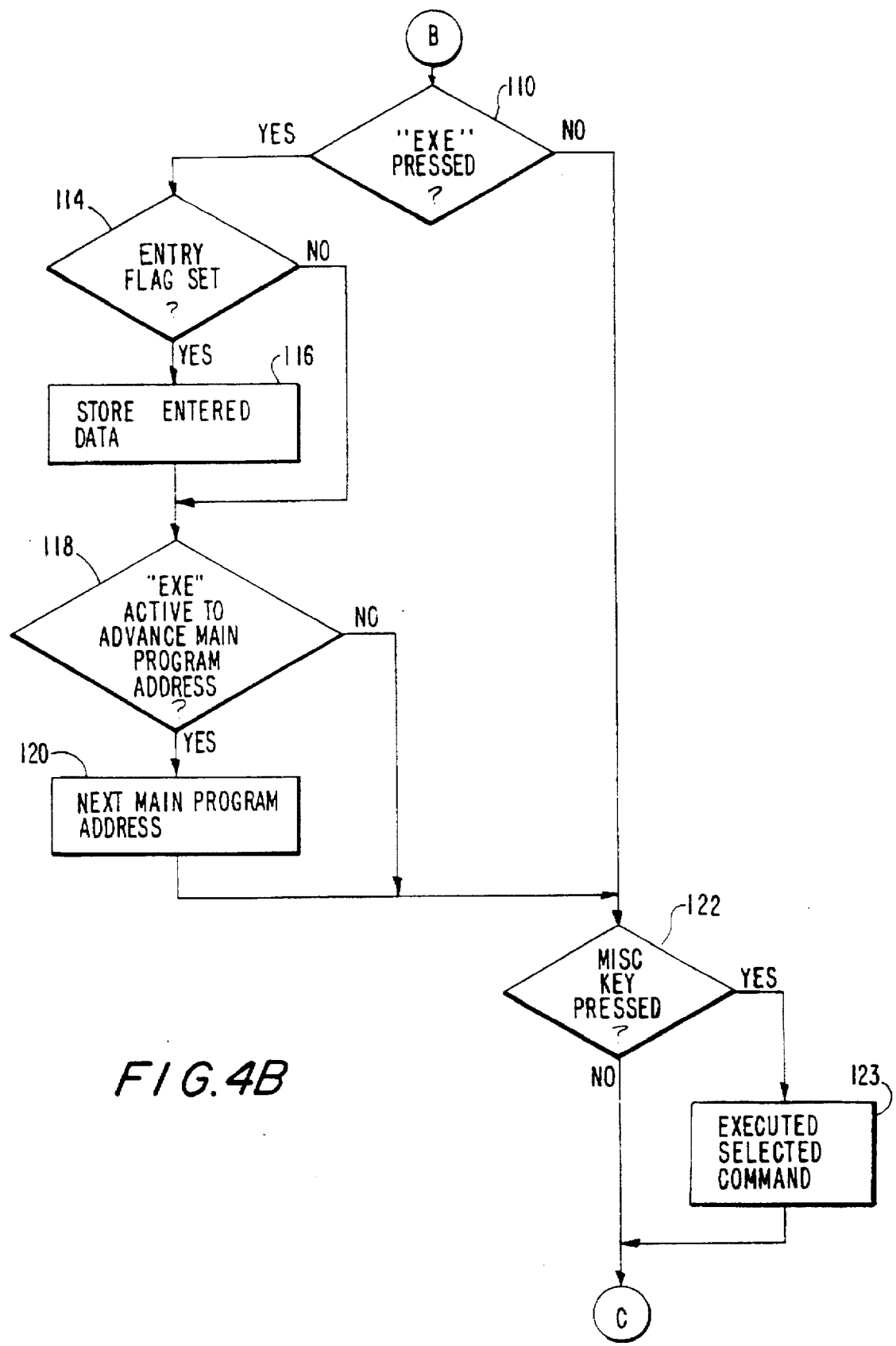
Figure 4C:
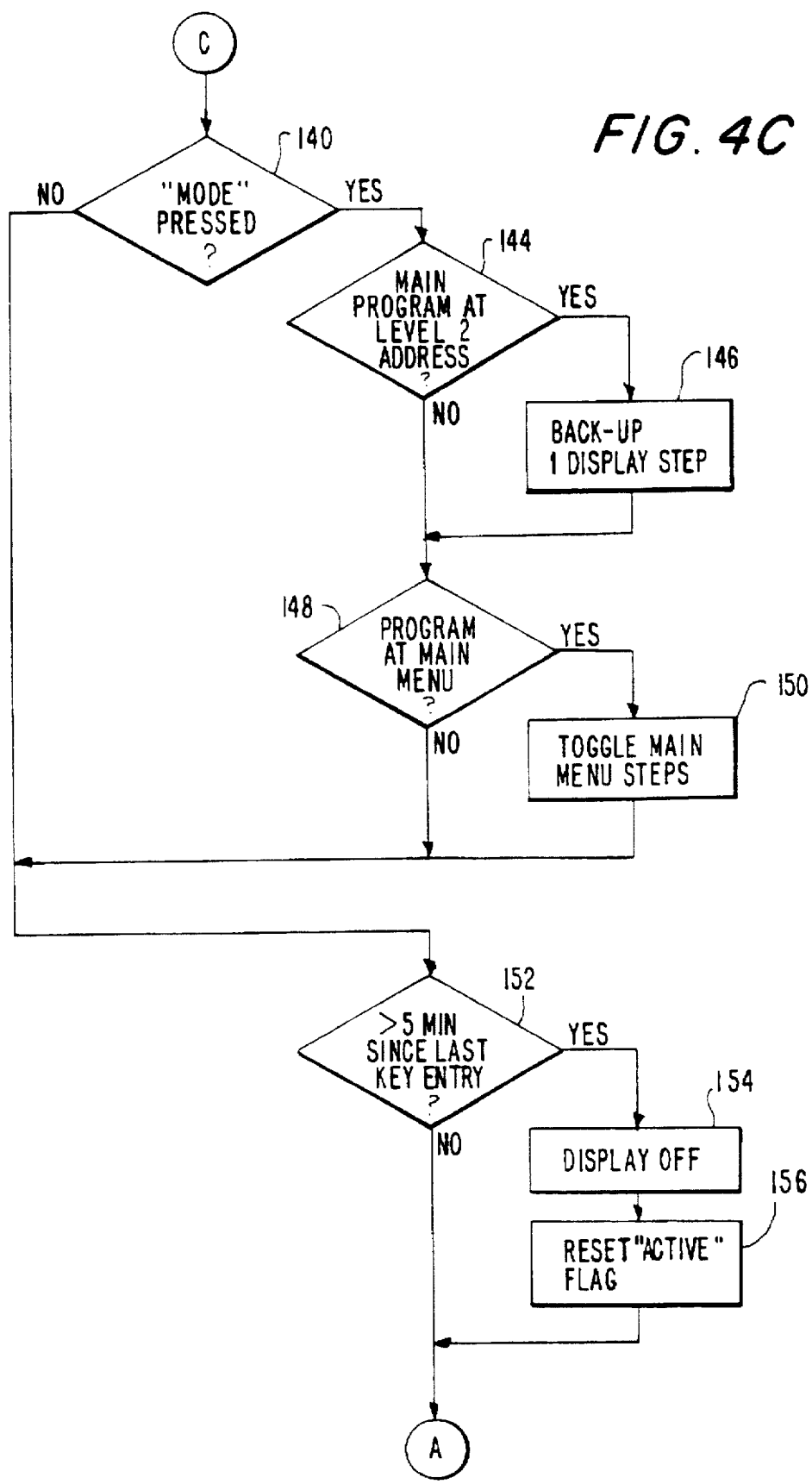

With reference now to FIGS. 4A through 4C, a basic control program for the device 44 is illustrated therein. It will be seen that the basic control program is implemented as an endless control loop in which the states of certain control keys of the keypad data entry device 48 are tested on a continuous basis to determine the commands and data input by the respondent, and to carry out the appropriate control tasks. Before the device 44 is mailed or otherwise provided to a respondent for carrying out a survey, power is applied to the microprocessor 54 which is then initialized at a "Start" program address, an "Active" flag is reset to indicate that the device is then not in use by a respondent and the microprocessor 54 proceeds to test continuously whether a "Clear/ON" key 98 has been depressed, as indicated by step 100 in FIG. 4A. Refer also to FIG. 2. In the absence of activation of the "Clear/ON" key 98, the microprocessor 54 continually tests the "Active" flag (finding it reset) in a step 102 and tests in a step 104 whether a predetermined minimum number of hours (such as 24 hours) have elapsed since a last data entry by the respondent. Since at this point no entries have been made the program cycles back to the step 100 to monitor the condition of the "Clear/ON" key.

When the intended respondent receives the device 44 and presses the "Clear/ON" key 98, the microprocessor 44 then proceeds in a step 106 to detect whether the display 50 is then energized. Finding that it is not, the microprocessor 54 thereupon turns on the display and sets the "Active" flag in a step 108 in order to enable the commencement of operation by the respondent. At this point, an appropriate information display is provided by the display 50 under the control of the microprocessor 54, as determined by a main program address and as described in greater detail hereinbelow.

Once the display has been energized, the microprocessor 54 proceeds to test the states of a number of control keys in sequence. In a step 110 (FIG. 4B), the microprocessor 54 tests the state of an "EXE" key 112 (FIG. 2). The "EXE" key 112 is used to enter data and/or commands and to jump to a next main program address. As shown in FIG. 4B, when the microprocessor 54 detects that the "EXE" key has been pressed it tests an "Entry" flag in step 114 to determine if data or a command has been entered by the device 48 and, if so, the entered data or command is stored in the RAM 60, as indicated by step 116.

At most stages of the main program, the "EXE" key 112 is active to advance the main program address. In a step 118, the microprocessor 54 tests the status of the "EXE" key to determine whether it is active to advance the main program address and, if so, the next address is set in a step 120.

In a subsequent step 122, the microprocessor 54 tests the states of various miscellaneous control keys. The states of an up arrow key 124 and of a down arrow key 126 are tested and if it is found that they have been depressed, and certain additional conditions are fulfilled, a corresponding operation is carried out in a step 123. For example, in certain data entry modes (such as a date and time entry mode) the up and down arrows 124 and 126 are respectively operative to positively and negatively increment values for which a cursor has been positioned on the display 50. In certain operational modes, moreover, the up and down arrows 124 and 126 are operative to back up and advance information displays provided by the display 50 on an incremental basis, for example, in order to provide sequential displays of instructional information or to advance or back up prompt screen displays. In addition, the up and down arrow keys 124 and 126 are operative to move the cursor on the display 50 respectively in an upward and downward direction where this freedom of movement is permitted by the program providing the respective display then appearing on the display 50.

The microprocessor 54 also tests the states of a right arrow key 128 and a left arrow key 130 and conditionally executes a command indicated thereby which is determined by the context in which the keys 128 and 130 have been actuated. For example, where the cursor is free to move in a right or left direction within the display currently appearing on the display 50, depressing the right arrow key 128 will move the cursor one location to the right and depressing the left arrow key 130 will move the cursor one location to the left. Where the cursor is free to move either vertically or horizontally (for example, throughout a plurality of vertically arranged columns) depressing the right arrow key 128 will move the cursor to the right and if it is at an extreme right to location in the display 50, downwardly and to the left, whereas under these circumstances depressing the left arrow key 130 will move the cursor to the left and, if it is at an extreme left position of the display 50, will move the cursor upwardly and to the right. Moreover, where the cursor is constrained to move in a single vertical column, actuation of either of the right or left arrow keys 128 and 130 will cause the cursor to move either downwardly or upwardly, respectively, through the various vertical positions provided on the display 50.

The microprocessor 54 in step 122 also tests the condition of a delete "DEL" key 132 and if it has been pressed, will delete an entered character from the display as determined by the position of the cursor. The microprocessor 54 also tests the states of the remaining keys of the keypad data entry device 48 to determine whether alpha/numeric characters have been entered. In this respect, it is to be noted that a number of the keys provided in the device 48 are dual purposed entry devices, such that the data entered by depressing such a key depends upon prior actuation of a shift key 134. While several of the alpha/numeric keys are illustrated in FIG. 2, the remainder have been omitted therefrom for purposes of simplicity and clarity. In addition, a space key 135 is provided to create a space in the entered data as it appears on the display 50.

After steps 122 and 123, the microprocessor proceeds to a step 140 (FIG. 4C) in which it determines the state of a "MODE" key 142 (FIG. 2). If the MODE key 142 has been pressed, and the main program is at a level 2 address (that is, other than in a "Main Menu" mode for selecting an operational mode of the device, as described more fully hereinbelow) the microprocessor 54 causes the display 50 to replace a present information display with a next previously appearing information display. Refer to steps 144 and 146 in FIG. 4C. If, however, the program is at a Main Menu address, as indicated in steps 148 and 150, the display can backup no further and the microprocessor 54 instead causes the display 50 to toggle between two available Main Menu displays. If, however, the program is at a "Start" address, depressing the MODE key 142 has no effect.

After testing the state of the MODE key 142, the microprocessor 54 then determines whether five minutes have elapsed since a next preceding key entry has taken place (step 152) and, if so, the display is de-energized (step 154) and the "Active" flag is reset (step 156) so that the microprocessor assumes a "Wait" state for conserving energy and cycles through steps 100, 102 and 104 of FIG. 4A. With reference again to FIG. 4A, if a predetermined number of hours have elapsed since a last entry of radio, television or VCR usage information and the microprocessor is then in an inactive state (that is, the "Active" flag is reset) this is determined in a step 104. If so, and provided that the real or actual time at the respondent's location is not between 10 PM and 8 AM, the microprocessor 54 causes the alarm device 64 (FIG. 1) to emit an audible alarm for alerting the respondent that no entries have been made within the predetermined time period. The time period may be for example, 24 hours where a television or radio survey is conducted over a survey period of typically one week's time. Prohibiting emission of an audible alarm between 10 PM and 8 AM avoids disturbing the respondent during normal sleeping hours. The audible alarm alerts the respondent to reactivate the device 44 by pressing the Clear/ON key to make any required entries. In this manner, the likelihood that respondents will forget to make timely survey data entries is reduced, thus to increase the reliability of data gathered with the use of a device such as the device 44.

In the event that the Clear/ON key 98 is pressed while the display is active, the program branches at step 106 to execute a program address jump which is dependent on the existing main program address. That is, in a step 162, it is determined whether the main program is at a level 2 address, in which case by pressing the Clear/ON key 98 the respondent causes a jump to the Main Menu. See step 164. If, however, the main program is already at the Main Menu when the Clear/ON key 98 is pressed, the display is turned off, the "Active" flag is reset and the main program address is set to "Start" (see steps 166 and 168). However, so long as the Clear/ON key has not been pressed while the "Active" flag is set, the microprocessor 54 continuously tests the states of the EXE key 112, the MODE key 142 and the various other keys described above to determine whether any commands have been thus input by the respondent, as well as to determine whether the device 44 should be placed in an "inactive" state in the absence of a key entry within a five minute interval. Refer to steps 100, 102, and 110–156 of FIGS. 4A–4C.

Figure 5A:
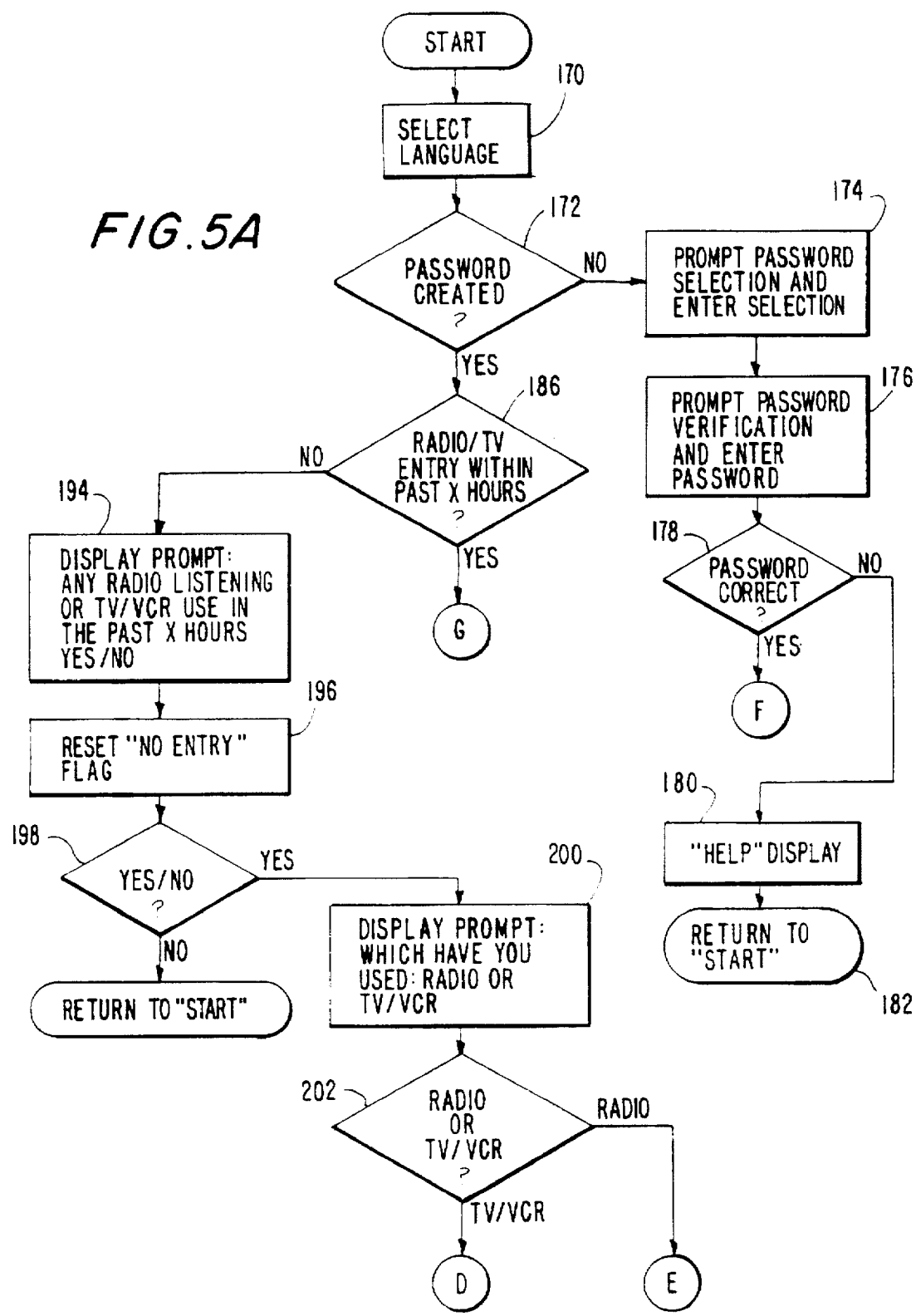
FIGS. 5A through 5D together provide a flow chart for a main program of the self-administered survey device.

Referring now to FIGS. 5A–5D, the overall organization of a main program of the device 44 is illustrated therein. Referring first to FIG. 5A, at the program "Start" address, and until the Clear/ON key 98 is pressed, the device remains inactive and neither displays information on the display 50 nor enters data or commands when any of the other keys (besides the Clear/ON key 98) is pressed. However, if the Clear/ON 98 key is pressed when the main program is at the Start address, the microprocessor 54 causes the display 50 to provide a display of a language selection prompt in a step 170 which invites the respondent to select a language from among a plurality of languages listed in a menu appearing on the display 50 in which all subsequent displays will appear until the device 44 is once again deactivated. When the respondent presses the EXE key 112 to enter the selected language, the main program proceeds to a step 172 in which it determines whether or not a user password had previously been created by the respondent. If not, the program branches to a step 174 in which a password selection prompt is displayed by the display 50 under the control of the microprocessor 54 which invites the entry of a password selected by the respondent. Upon the entry of the desired password and depression of the EXE key 112, the program proceeds to a step 176 in which the respondent is asked to reenter the created password for verification purposes. If the reentered password is incorrect, in a step 178 the microprocessor branches to a step 180 in which the respondent is prompted by a "Help" display to contact the survey organization by telephone for assistance. Thereafter, the program returns to the "Start" address, as indicated at 182 and will no longer permit further operation without entry of the already created password.

If, however, the reentered password is correct, the program branches at the step 178 to a step 184 (FIG. 5B) for the selection of a desired "Radio" or "TV/VCR" operational mode, as explained in greater detail below. If, however, a password had previously been selected before the key 98 was pressed, once the language has been selected in the step 170, the program determines in a step 186 whether a radio, television or VCR usage entry has been made within a predetermined time period. If such an entry had been made, the program branches to a step 188 in which a password prompt is displayed by the display 50 and the respondent is invited to enter his or her password. Once the password has been entered by pressing the EXE key 112, the microprocessor 54 determines in a step 190 whether the password is correct and, if not, the previously described "Help" display is provided by the display 50 (step 192) and the program returns to the "Start" address such that the display is de-energized and the "Active" flag is reset. If, on the other hand, the correct password has been entered, the program advances to the main menu (step 184, et seq.). Accordingly, by preventing access to the operational modes of the device by unauthorized persons, the password feature inhibits the creation of survey responses by persons other than the respondent by inhibiting both the entry and storage of unauthorized data. It likewise discourages unnecessary power usage by disabling the display 50 if the correct password is not entered.

With reference again to FIG. 5A, in the event that a password had previously been created but no entry had been made within the predetermined number of hours, the program branches at the step 186 to a step 194 in which the display 50 provides a prompt to the respondent to determine whether the respondent has either listened to radio, viewed television or used a VCR within a predetermined time period. Thereafter, in a step 196 a "No Entry" flag which was previously set to cause the branch from the step 186 to the step 194 is reset. Subsequently in a step 198 an answer to the prompt displayed in the step 194 either causes a return to the "Start" address if such answer was negative or a branch to a step 200 in which the display provides a prompt for determining whether radio or TV/VCR was used. The entered response is used as a basis for determining in a step 202 whether to branch to a radio entry program or a TV/VCR program for entering survey information regarding the programs listened to or viewed, times, places, etc., as described in greater detail hereinbelow.

With reference again to FIG. 5B, as noted above in the step 184 the respondent is asked to choose either a "Radio" or a "TV/VCR" program, depending upon the nature of the survey being conducted. This enables the use of the device 44 for carrying out multi-media surveys for either the radio or television media. Depending upon the entered response, in a step 204 the program either branches to the TV/VCR program (FIG. 5C) or the Radio program (FIG. 5D).

Figure 5B:
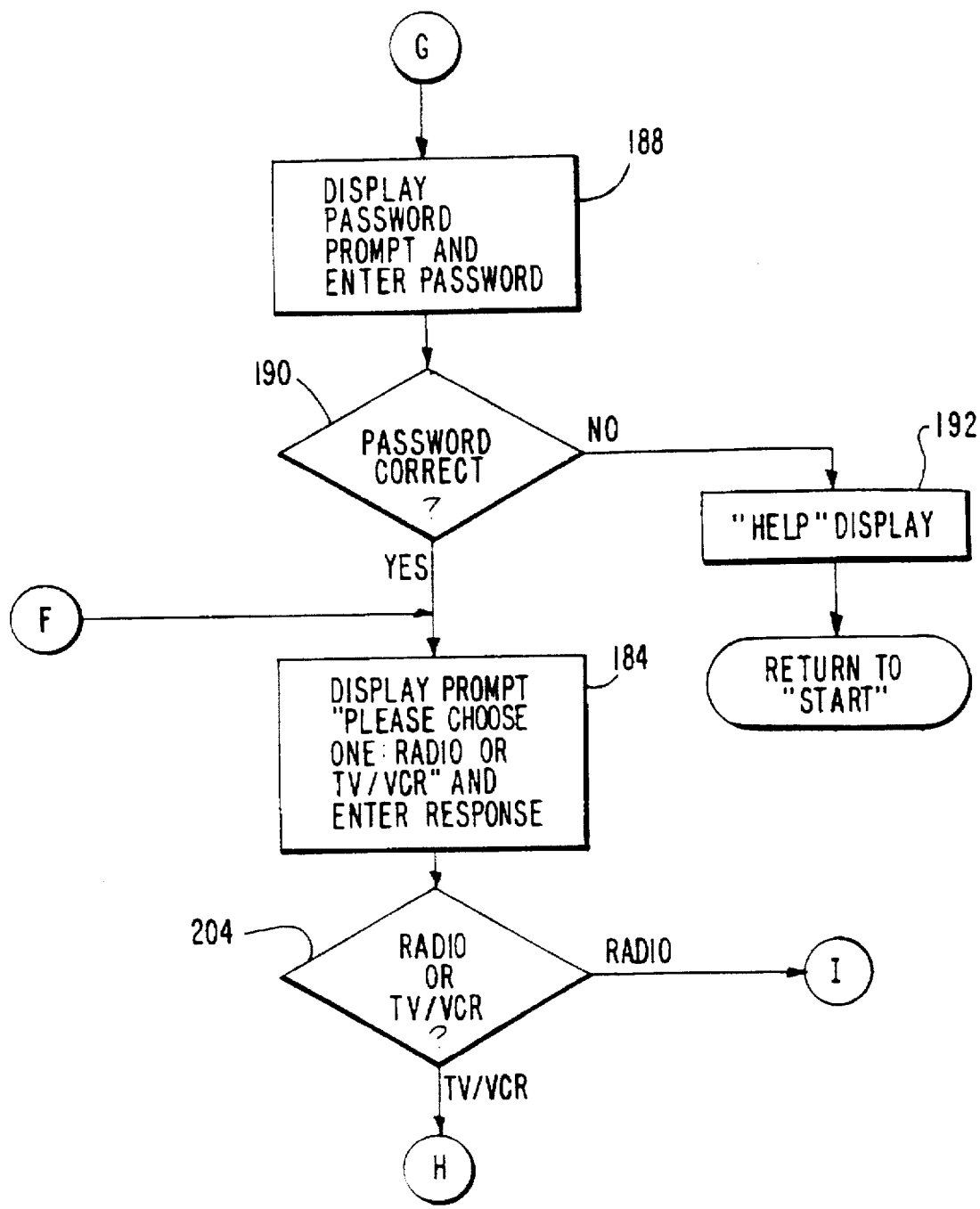
Figure 5C:
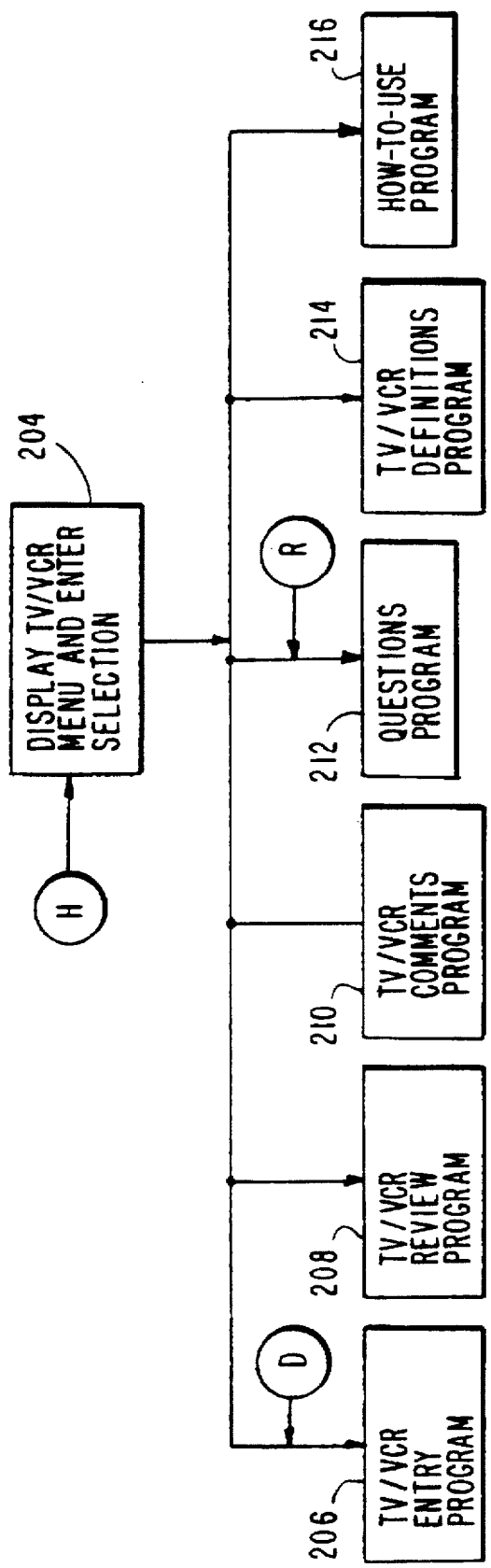
Figure 5D:
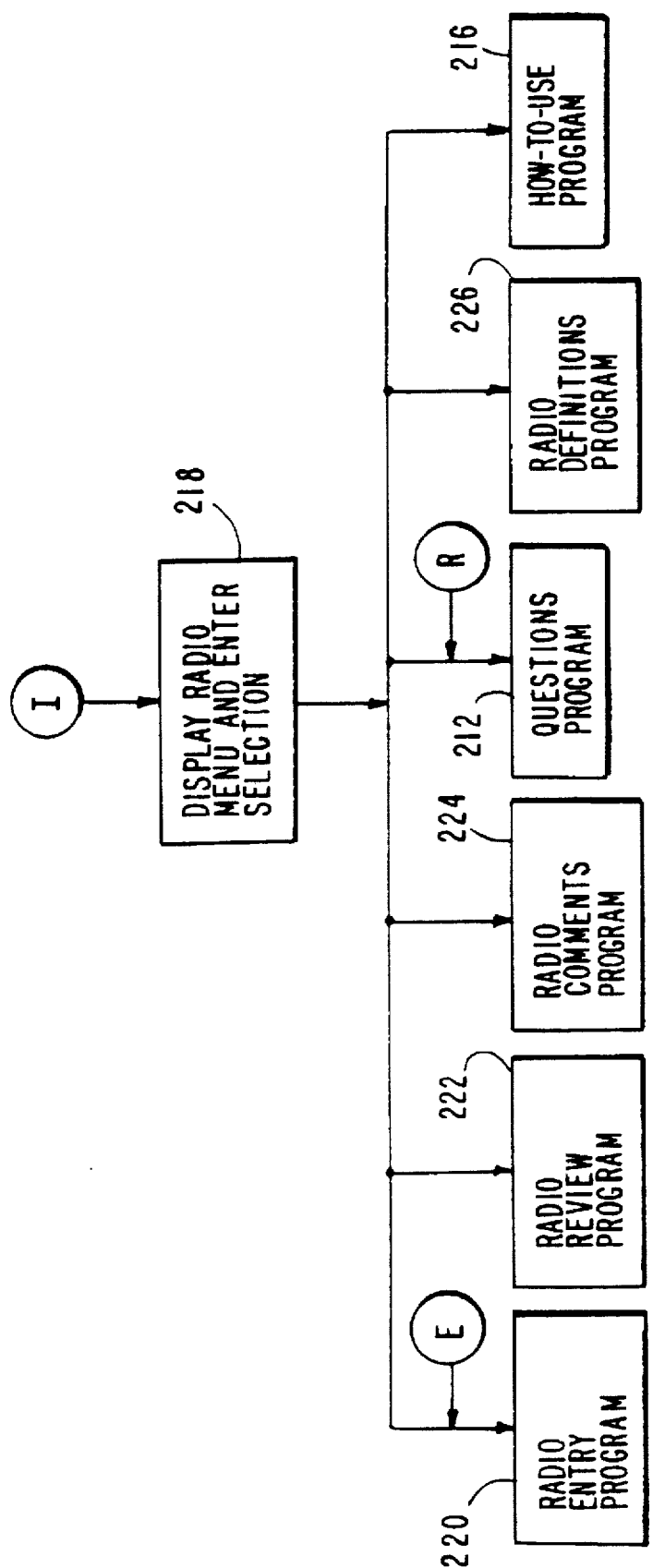

With reference to FIGS. 5C and 5D, the TV/VCR and Radio programs are arranged similarly, each providing the respondent with a selection of six subprograms, several of which are common to both the TV/VCR program and the Radio program. In the TV/VCR program in a step 204, the user is provided with a menu on the display 50 identifying each of the six available subprograms. The first such program (indicated at 206 in FIG. 5C) is the TV/VCR entry program wherein data concerning the respondent's television viewing and VCR usage are entered by means of a sequence of prompts and data entry steps. In the alternative, the respondent may select a TV/VCR review program 208 in which previously entered viewing and usage data may be reviewed on a day-by-day basis. In a TV/VCR comment program 210 the respondent is given an opportunity to enter textual comments either about television programs or TV stations as well as to review and edit previously entered comments. In a questions program 212 the respondent is asked to enter certain demographic information (such as age, sex, etc.) which are important for advertisers, advertising agencies and broadcasters to have in determining the significance of viewing patterns as reflected by other survey results. In a TV/VCR definitions program 214, the respondent is provided with definitions for important terms used in the displays of the device 44 to help ensure that the respondent understands what information is being requested in the course of a survey. Finally, in a how-to-use program 216 the respondent is provided with step-by-step instructions for using the device as well as the opportunity to make practice entries before making actual survey data entries.

With reference now to FIG. 5D, selection of the "Radio" program results in a branch to the Radio menu in a step 218 wherein the respondent is given the option of selecting one of six radio subprograms. The first such program is a radio entry program 220 which enables the respondent to enter radio listening information (such as station, time, location, etc.), and is analogous to the TV/VCR entry program 206. An alternative subprogram is the radio review program 222 in which the respondent is given the opportunity to review entries made on a day-by-day basis during the survey time period. A further subprogram is the Radio comment program 224 in which the respondent is given the opportunity to enter textual comments concerning radio stations, announcers and programs, as well as to review and edit prior comments. The respondent is also enabled to access the questions program 212 from the radio menu as well as from the TV/VCR menu as noted above in connection with FIG. 5C. A further subprogram available from the Radio menu is a Radio definitions program 226 which provides the respondent with definitions of key terms used in carrying out the radio survey. The respondent is also given the opportunity to access the how-to-use program 216 from the radio menu.

Figure 6A:
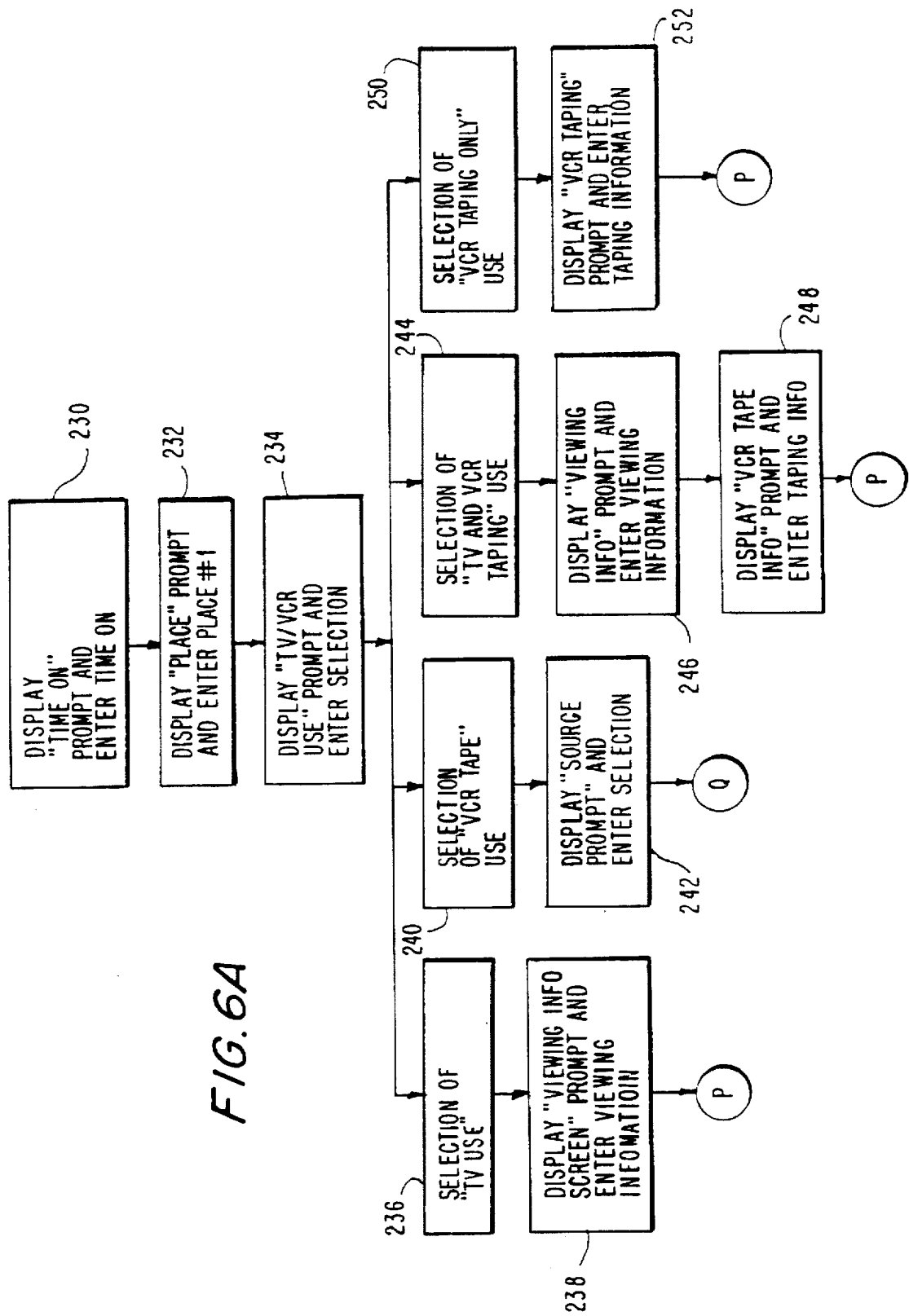
FIGS. 6A through 6D together provide a flow chart for a television/VCR entry program of the self-administered survey device.

With reference now to FIGS. 6A–6D a flow chart of the TV/VCR entry program 206 of FIG. 5C is provided therein. Referring first to FIG. 6A, in steps 230 and 232 the respondent receives a pair of sequential prompts requesting the respondent to enter the time at which he or she began viewing television or using a VCR and the place in which such viewing or use occurred. The microprocessor exercises supervisory control over the offered entries as follows. The time information offered by the respondent is first compared against real time, and if it is a future time, the microprocessor 54 produces an appropriate control signal which prevents entry of the offered information which consequently prevents storage thereof in the RAM 60. In certain alternative embodiments, the entry of a future time is allowed but not stored in the RAM 60, so that the respondent can see what was entered and an appropriate prompt is produced to alert the respondent that the entered time is in the future and to reenter a correct time. Moreover, the microprocessor 54 conducts a similar data comparison to determine whether the offered time precedes the survey start time, precedes the time that viewing or VCR use commenced or overlaps a prior entry. Thereupon the microprocessor likewise prevents entry of the offered information thus to prevent storage thereof in RAM 60. In alternative embodiments, entry is permitted without storage and an appropriate prompt is displayed to the respondent implicating that the offered data is unacceptable and requesting the entry of corrected time data. The foregoing supervisory functions are likewise carried out in the Radio entry program, described below, for time of listening type entries.

Subsequently, in a step 234, the respondent is provided with a menu of four types of TV/VCR use options, namely, "TV Use" (that is, television viewing without the use of a VCR), "VCR Tape Play" (that is, viewing a program reproduced from tape by a VCR), "TV and VCR Taping" (that is, viewing a program and taping simultaneously), and "VCR Taping Only" (that is, taping of a program without simultaneously watching TV). If the respondent selects "TV Use" in a step 236, the respondent is prompted to enter the call letters of the television station, the channel, and the title of the program. In the television definitions program, the respondent is advised that call letters include the letters used to identify cable services as well. The microprocessor then performs several supervisory functions. It determines whether data entered as call letters are acceptable, that is, whether the data consist of three or four call letters only. If a different number or if numerals or other symbols are included, the microprocessor refuses to store the offered data and prompts the respondent to enter new call letters. In addition, the call letters are compared against a look-up table of channels/stations which should be receivable by the respondent within his or her local area and, if not, a prompt is displayed to question the correctness of the entered data. The microprocessor subsequently permits storage of the data if the user confirms its correctness and the data is submitted in the proper format (that is, only three or four alphabetical characters). The look-up table feature is described in greater detail in connection with the Radio entry program below. The foregoing supervisory functions are carried out each time station/channel identification data are entered both in the TV/VCR and Radio entry programs.

Figure 6B:
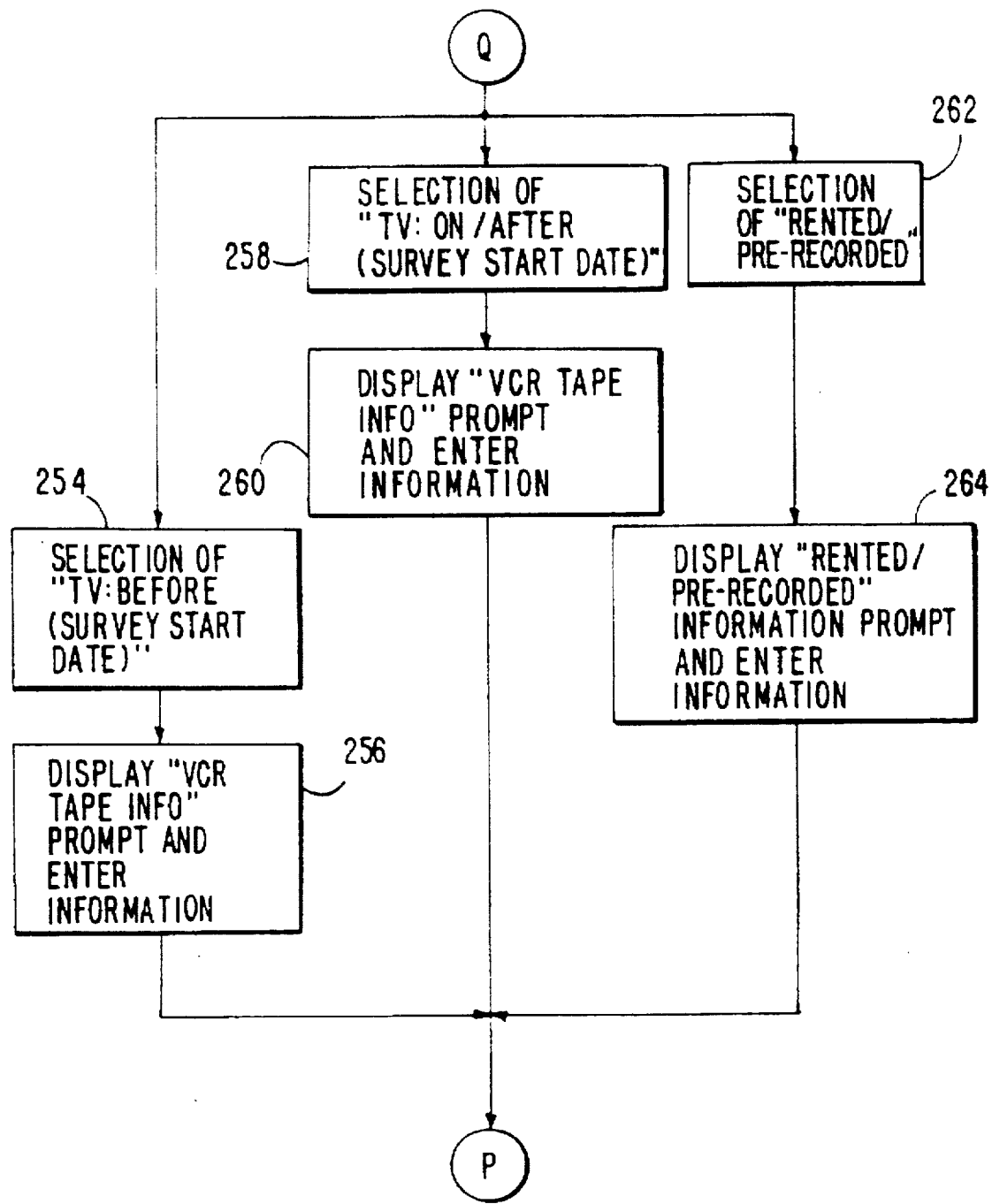

If the respondent selects "VCR Tape Play" in step 240, the respondent is asked to enter the source of the program being viewed, that is, broadcast or cable television, or a rented/ pre-recorded tape, as indicated in a step 242. With reference also to FIG. 6B, selection of "VCR Tape Play" in the step 240 results in the display of a menu enabling the respondent to select the source category for the program being viewed from the tape. That is, in a step 254, the respondent may indicate that the source is a broadcast or cable channel taped prior to the beginning of the survey start date, whereupon the respondent is prompted to enter appropriate program, channel and call letter information in a step 256. If, however, the respondent indicates that the source was a broadcast or cable program aired on or after the survey start date, as indicated in a step 258, the respondent is asked to enter the same type of information as in the step 256 in a step 260. If, however, the respondent indicates that the source of the program was a rented or a pre-recorded tape other than as indicated for steps 254 and 258, the program proceeds from a step 262 to a step 264 in which the respondent is prompted to enter the title of the tape.

If the respondent selects "TV and VCR Taping" in a step 244, the respondent is first asked to enter viewing information concerning the source of the program in a step 246 and is then asked to enter the source of the program being taped in a step 248. If, however, the respondent selects "VCR Taping Only" in a step 250, the respondent is prompted to enter the source of the program being taped in a step 252.

Figure 6C:
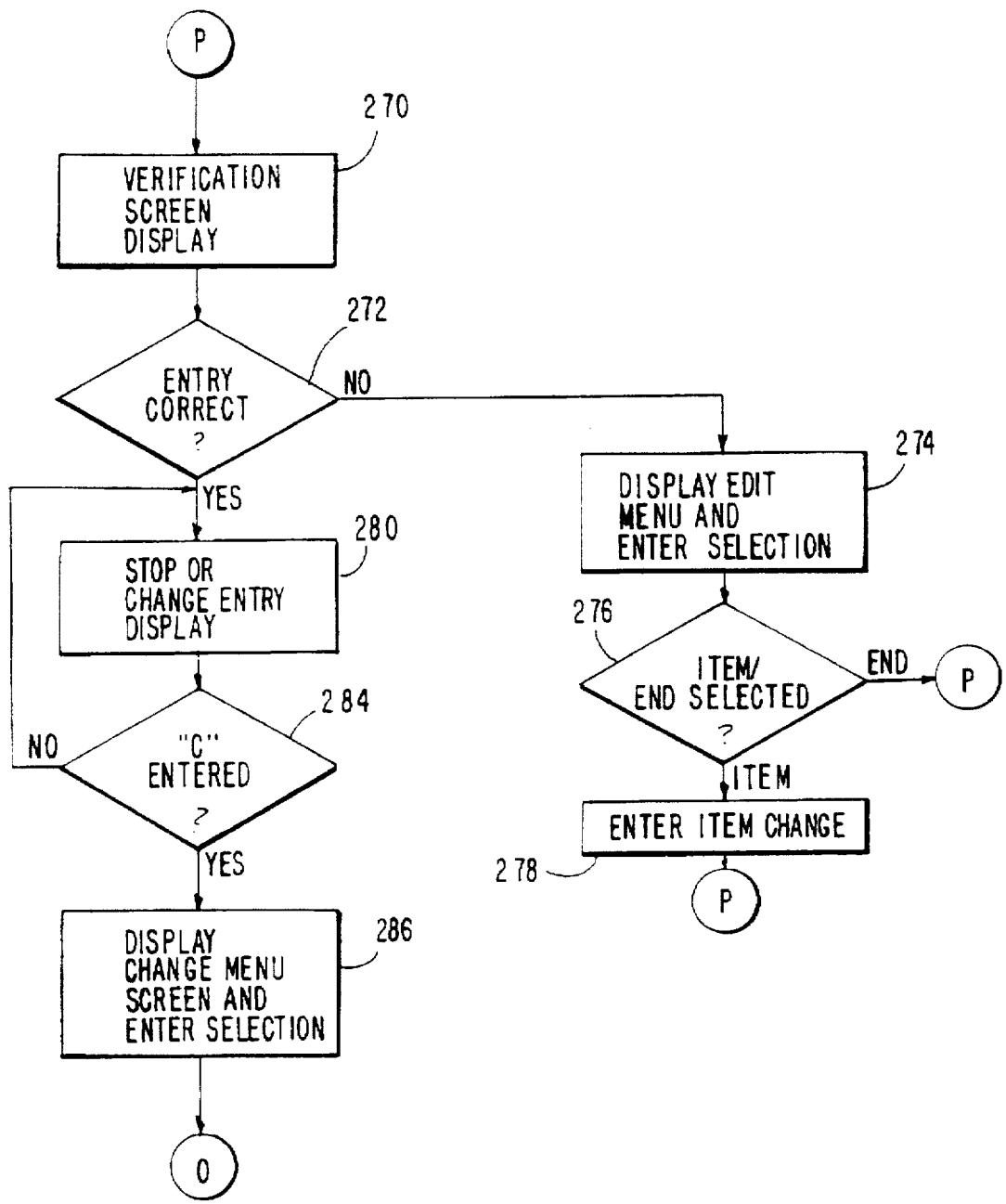

With reference to FIG. 6C, the information which has just been entered by the respondent is provided in the form of a verification screen on the display 50, as indicated in a step 270 and the respondent is asked to indicate whether the displayed information is correct. If the respondent indicates that the information is not correct, the program branches from a decision step 272 to a step 274 wherein an edit menu is displayed listing the various types of data provided on the verification screen display and enabling the respondent to select the type of the data that must be changed to correct the inaccurate entry. Once the respondent selects the item to be changed, in a step 276 the program branches to an item change display step 278 which permits the respondent to enter the change, whereupon the program returns to the verification screen display step 270. If however, the respondent does not wish to change an item at the step 274, he or she may select a listed item "End" whereupon the program again branches to the step 270 without changing the entered information.

Figure 6D:
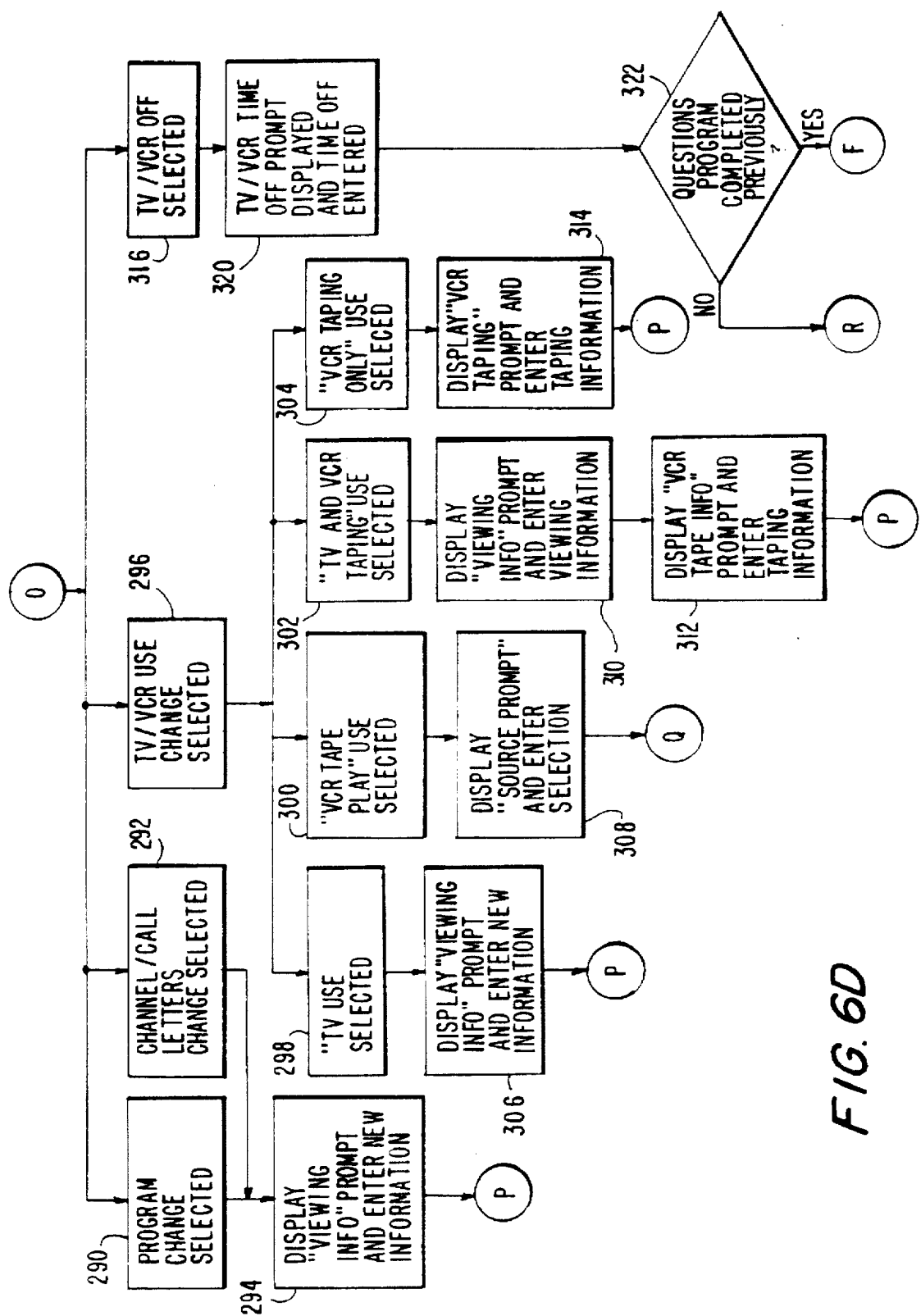

Once the respondent has indicated that the entry is correct, the program proceeds to a "Stop or Change Entry Display" step 280 wherein the device 44 waits for the respondent to indicate that TV viewing and/or VCR use has changed. This is done by actuating the "C" key (282 in FIG. 2), whereupon the program branches from a decision step 284 to a display step 286 in which the respondent is given the opportunity to select a change of the program, channel/call letter, or TV/VCR use data, for example, when the channel is changed or a new tape is to be viewed. A further item displayed in the menu provided in the step 286 may be selected for entering a TV/VCR off condition. With reference to FIG. 6D, upon selection of program or channel change from the menu of step 286, as indicated in steps 290, 292 and 294 the respondent is provided with an appropriate display for entering the new program, channel or call letters.

If, however, the respondent indicates that a change in the TV/VCR use has occurred (step 296) the respondent is then provided with a change menu to again select either "TV" use, "VCR Tape Play" use, "TV and VCR Taping" use, or "VCR Taping Only" use (steps 298, 300, 302, and 304). Selection of "TV" use enables the respondent to enter updated information in a step 306 of the same type as entered in the step 238. Selection of "VCR Tape Play" use in the step 300 enables the respondent to enter updated information in a step 308 of the same type as previously entered in the step 242, whereupon one of the pairs of steps 254 and 256, 258 and 260, or 262 and 264 illustrated in FIG. 6B are then selected to enter updated "VCR Tape Play" use data. Selection of "TV and VCR Taping" use in step 302 enables the respondent to enter updated information in sequential steps 310 and 312 of the same type previously entered in steps 246 and 248, respectively. Once again the program returns to the verification screen display 270 to verify the newly entered information in the same manner as before.

It will be seen that the respondent is thus able to continuously update viewing or VCR use information until such time as viewing and VCR use are discontinued. In that event, in the step 284 the microprocessor 54 detects that the respondent has pressed the "C" key and proceeds to provide the change menu screen in step 286. Thereafter, the respondent selects "TV/VCR Off" in step 316, whereupon the respondent is prompted to enter the "Time Off" information in a step 320. Once the "Time Off" information has been thus entered, the microprocessor determines in a step 322 whether the demographic information which is requested by the questions program 212 (FIG. 5C) has been completely entered already. If not, the program branches to the questions program, as indicated in FIG. 5C. If, however, the information requested in the questions program is complete, the program instead branches to the step 184 in FIG. 5B to return to the main menu. If the respondent wishes to continue using the device 44, he or she is once again enabled to select either the Radio or TV/VCR program, as well as the individual menus thereof in steps 184, 204 and 218 (FIGS. 5B, 5C and 5D).

As a further check on the reliability of the various television viewing and VCR usage entries as described below, all entries are "time stamped" when they are stored. That is, a real time signal is stored with each entry in the RAM for later determining when the entry was actually made.

To assist the respondent in determining whether the device is operating properly, whenever the microprocessor must spend a perceptible amount of time in carrying out the program steps between displays, a display of "Please Wait" is provided to the respondent.

Since the various prompts for entering data cycle through a predetermined sequence for a given type of radio/TV/VCR usage so that all of the relevant types of data are thus requested, the likelihood that complete entries will be made is enhanced. In addition to the foregoing supervisory functions, the microprocessor checks all radio listings, television viewing and VCR usage entries to ensure that an end time has been entered before a similar new entry is permitted.

Figure 7A:
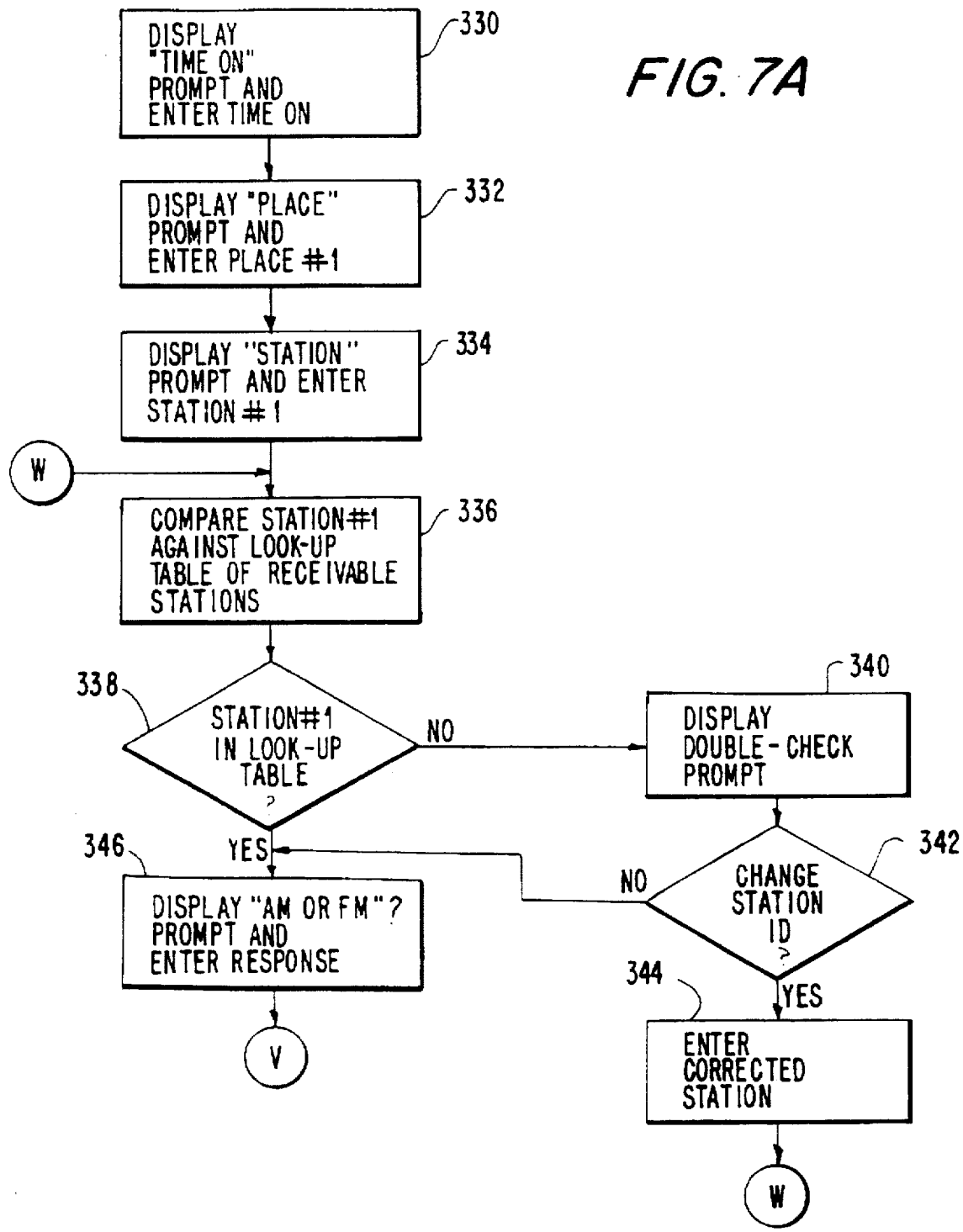
FIGS. 7A through 7C together provide a flow chart for a radio entry program of the self-administered survey device.
Figure 7B:
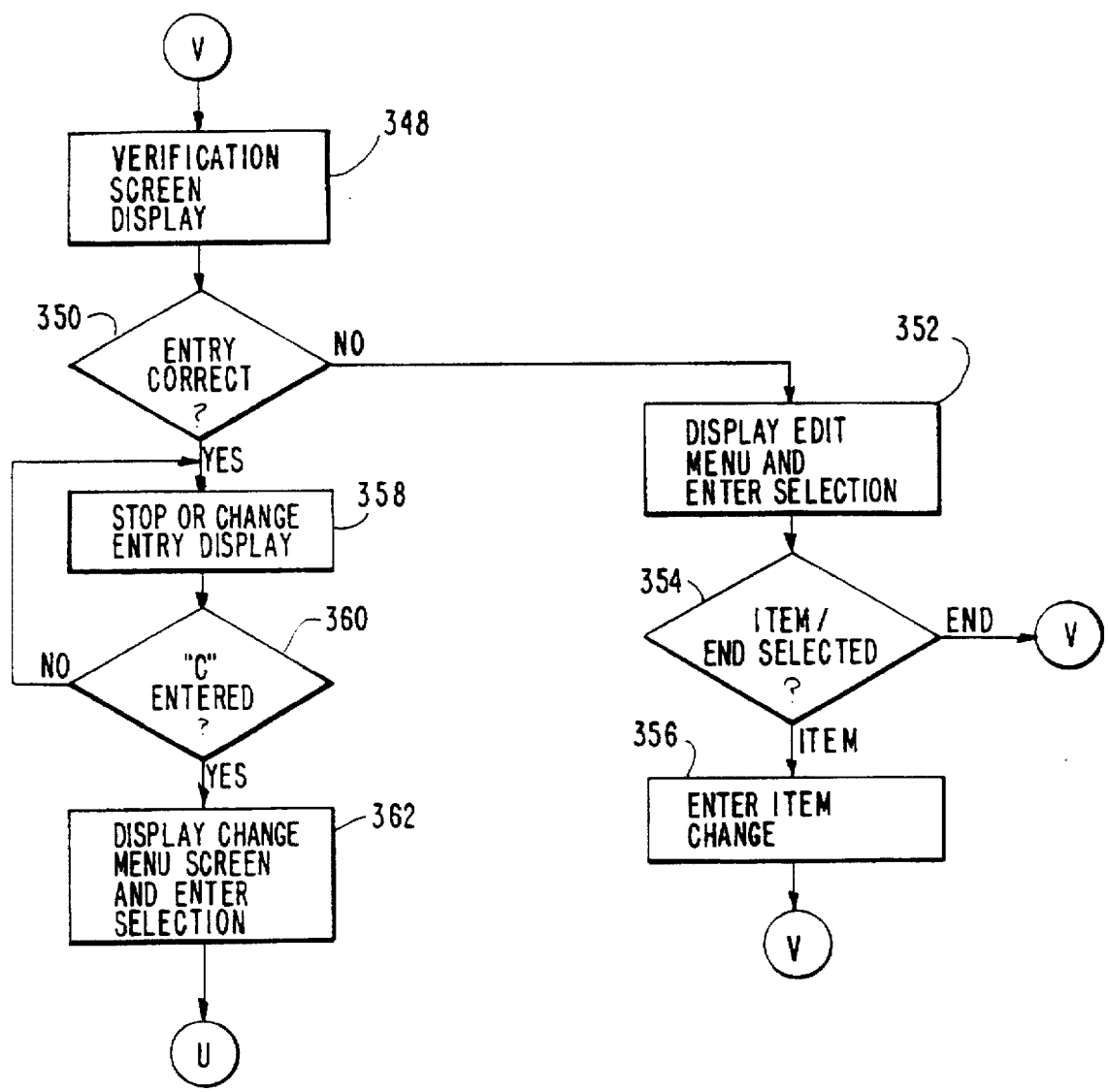
Figure 7C:
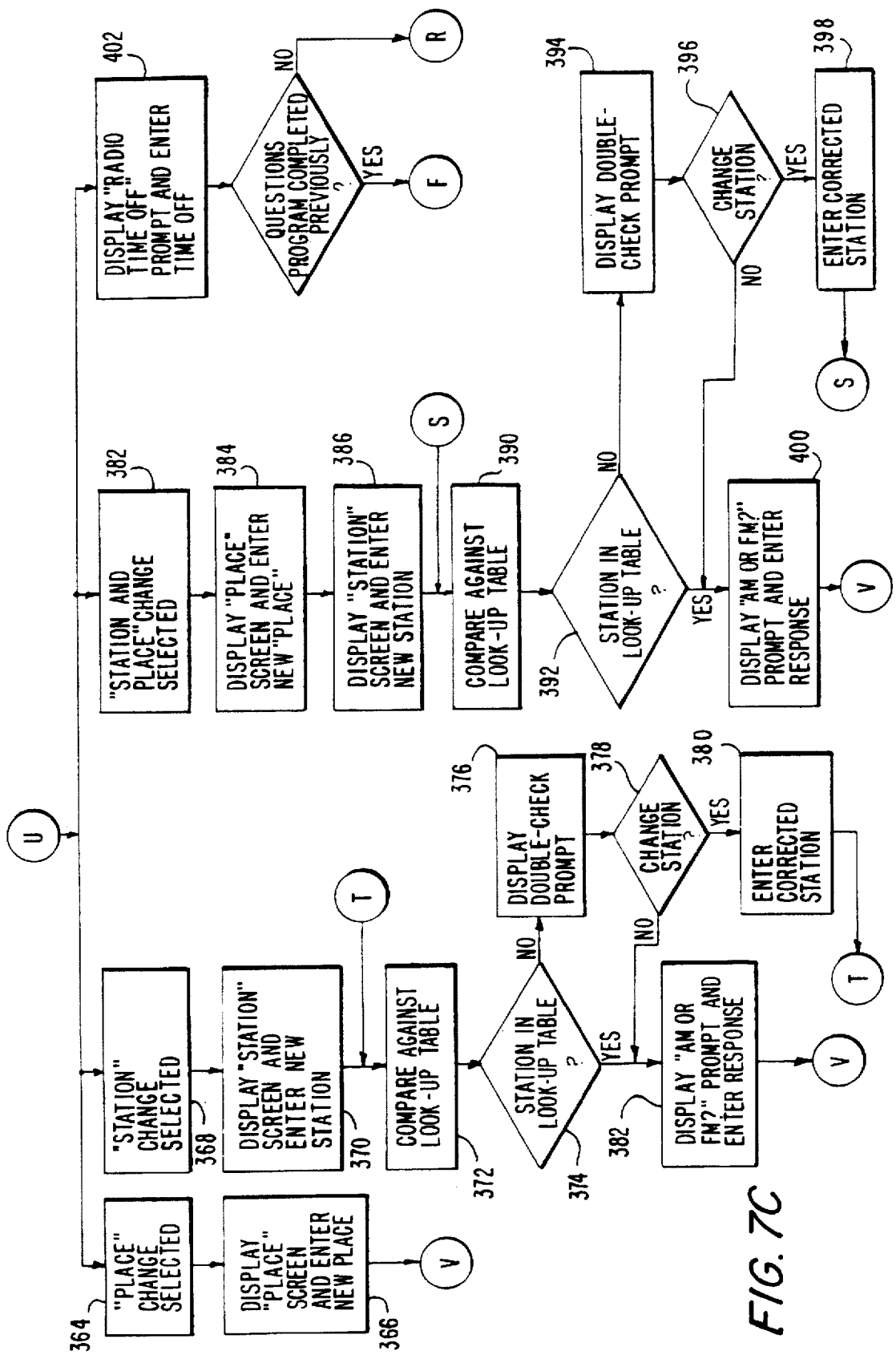

With reference now to FIGS. 7A, 7B and 7C, the radio entry program (indicated as 220 in FIG. 5D) is illustrated therein in detail. In steps 330 and 332 the respondent is prompted to enter the time at which listening began and the place where listening occurred. The microprocessor then carries out the supervisory checks as explained above in connection with the TV/VCR entry program for determining whether the time keyed in by the respondent is acceptable. In a subsequent step 334, the respondent is requested to enter the station call letters of the station he or she is listening to and these are then checked for appropriate form (three or four alphabetical characters only). In the next step 336, the entered call letters are compared against a look-up table of stations which should be receivable by the respondent within his or her local area. This table is stored in the RAM 60 by the audience survey organization utilizing the system illustrated in FIGS. 1 and 3 which enables a unique look-up table to be stored in each device 44 corresponding with the local area of the intended respondent before the device 44 is provided thereto. In a step 338, the microprocessor determines whether or not the entered station corresponds with a station listed in the look-up table and, if not, a double-check prompt is displayed in a step 340 to suggest that the respondent reconsider the entry as it is questionable. The respondent is then given an opportunity to indicate whether or not the station identification was correctly entered in the step 334, as indicated in a step 342. It is preferable to merely display a prompt, rather than bar entry of stations not included in the look-up table since the respondent may be travelling outside his or her local area. In the event that the respondent chooses to enter a corrected station identification, this is carried out in a step 344, after which the program branches once again to the step 336 for comparison of the newly entered station identification with the data in the look-up table.

If, however, the respondent chooses not to change the previously entered station identification, the program branches to a step 346 wherein the respondent identifies whether the station listened to is an AM or FM station. Once this information has been entered, the program proceeds to a verification screen display step 348 (FIG. 7B) wherein the just entered data is displayed for review by the respondent who is given an opportunity to confirm whether it is correct in a step 350. If the respondent indicates that the information is not correct, an edit menu is displayed in a step 352 which enables the respondent to select an item to be changed or to indicate that no change is to be made. If the respondent indicates that no change is to be made, in a step 354 the program branches back to the verification screen display. If however, the respondent selects an item to be changed, in a step 356 the new data is entered, whereupon the program likewise returns to the step 348. Once the respondent is satisfied with the entered data, the program proceeds from the step 350 to a step 358 in which a "Stop or Change Entry Display" is provided indicating to the respondent that if a change in listening should occur or if listening ceases, the respondent should press the "C" key 282. Thereupon, as indicated in step 360, the program branches to a step 362 in which a change menu screen is displayed and the respondent is given the opportunity to select from a menu of possible changes.

With reference to FIG. 7C, upon the selection of a "Place" change, as indicated in a step 364, the device 44 displays a "Place" screen in a step 366 to permit the respondent to update the location at which he or she is listening to the radio. If the respondent instead selects a "Station" change as indicated in a step 368, a "Station" screen is displayed to enable the entry of the new station data (step 370) after which the new station identification is compared once again against the look-up table data in a step 372. If the station is not in the look-up table as indicated in decision step 374, a double-check prompt is displayed (step 376) and the respondent is given an opportunity to change the station (step 378). If the respondent then chooses to change the station identification, the new information is entered in a step 380, after which the program returns to the step 372, for once again comparing the newly entered station identification data to the look-up table data. If, however, the respondent chooses in step 378 not to change the station identification data, the program proceeds to a step 382 wherein the respondent is prompted to indicate whether the station is an AM or FM station.

If however in the step 362, the respondent chooses to change both the station and place, as indicated in a step 382, this information is entered in subsequent steps 384 and 386, whereupon the station identification data is again compared against the look-up table in a step 390 and, if not found there (step 392) the double-check prompt is again displayed in a step 394 and the respondent indicates in decision step 396 whether to change the station identification. If so, the corrected station identification data is entered in a step 398 and the program returns to the step 390 to compare the newly entered data against the look-up table. If, however, the respondent chooses not to change the station identification data in the step 396, the program instead proceeds to a step 400 in which the respondent is prompted to enter information indicating whether the new station is an AM or FM station. Once either the "Place", "Station", or "Station and Place" changes have been carried out, the program returns to the verification screen display 348 to verify the newly entered data.

The radio entry program will continue in this manner until such time that the respondent either chooses to exit by actuating the Clear/ON key 98, or chooses a menu item "Radio Time Off" in the step 362 as indicated in a step 402 (FIG. 7C). At this point, as in the case of the TV/VCR entry program, the microprocessor determines in a step 404 whether or not the information to be entered pursuant to the questions program has been entered in its entirety. If so, the program returns to step 184 of FIG. 5B to reenter the main menu mode. If not, the program instead branches to the questions program indicated as 212 in FIG. 5C.

Figure 8:
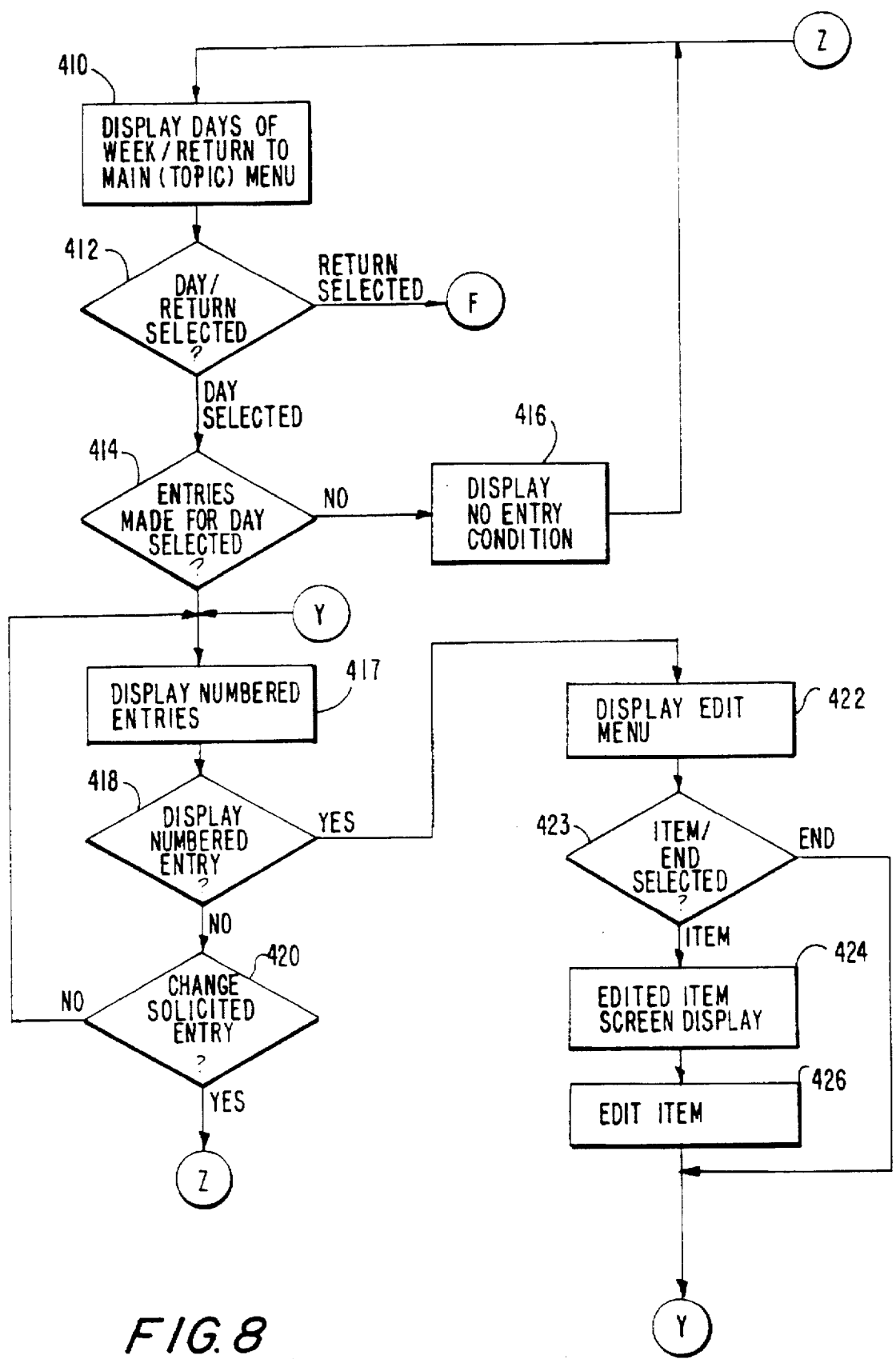
FIG. 8 is a flow chart of a review program of the self-administered survey device.

The TV/VCR review program 208 of FIG. 5C and the radio review program 222 of FIG. 5D are commonly illustrated in FIG. 8 for purposes of simplicity and clarity, since the structure of these programs and the types of displays provided in both are the same. In a step 410 the respondent is provided with a review menu listing the days of the survey time period, together with an option for returning to the main menu. If return is selected, in a step 412, the program branches back to the step 184 of FIG. 5B. However, in the event that the entries made for a given day are selected, the program branches to a further decision step 414 in which it is determined whether or not entries have in fact been made for the selected day. If not, the respondent is provided with a no entry condition display for that day (step 416) and the program returns to the review menu (step 410). If, however, there has been at least one entry made for the selected day, the program proceeds to a step 417 in which the first entry for the selected day is displayed and the respondent is provided with an interactive display permitting him or her to determine whether to change the first numbered entry (step 418). Should the respondent choose not to change the entry, the program proceeds to step 420 in which it is determined whether a change has been solicited for all of the entries made on the selected day and if not, the program returns to the step 416. If so, the program returns to the step 410 for the selection of a new day to review or to exit the review program.

If in the step 418 the respondent chooses to change the numbered entry, the program proceeds to a step 422 in which an edit menu is displayed listing the various types of information included in the selected entry as well as an "End" selection. Once the respondent has chosen the particular item to be changed, the program proceeds from a decision step 423 to an edited item screen display step 424 wherein the respondent is provided with an interactive display of the item to be changed and given the opportunity to effect the desired change (step 426). At this point the program returns to the step 416 so that the next numbered entry for that day may be viewed for editing.

Once all of the desired days and entries have been reviewed, in the step 410 the respondent is given the opportunity to return to the main menu in the step 412. It will be appreciated that, at any time, however, the respondent may jump back to the main menu simply by pressing the Clear/ON key 98.

Figure 9:
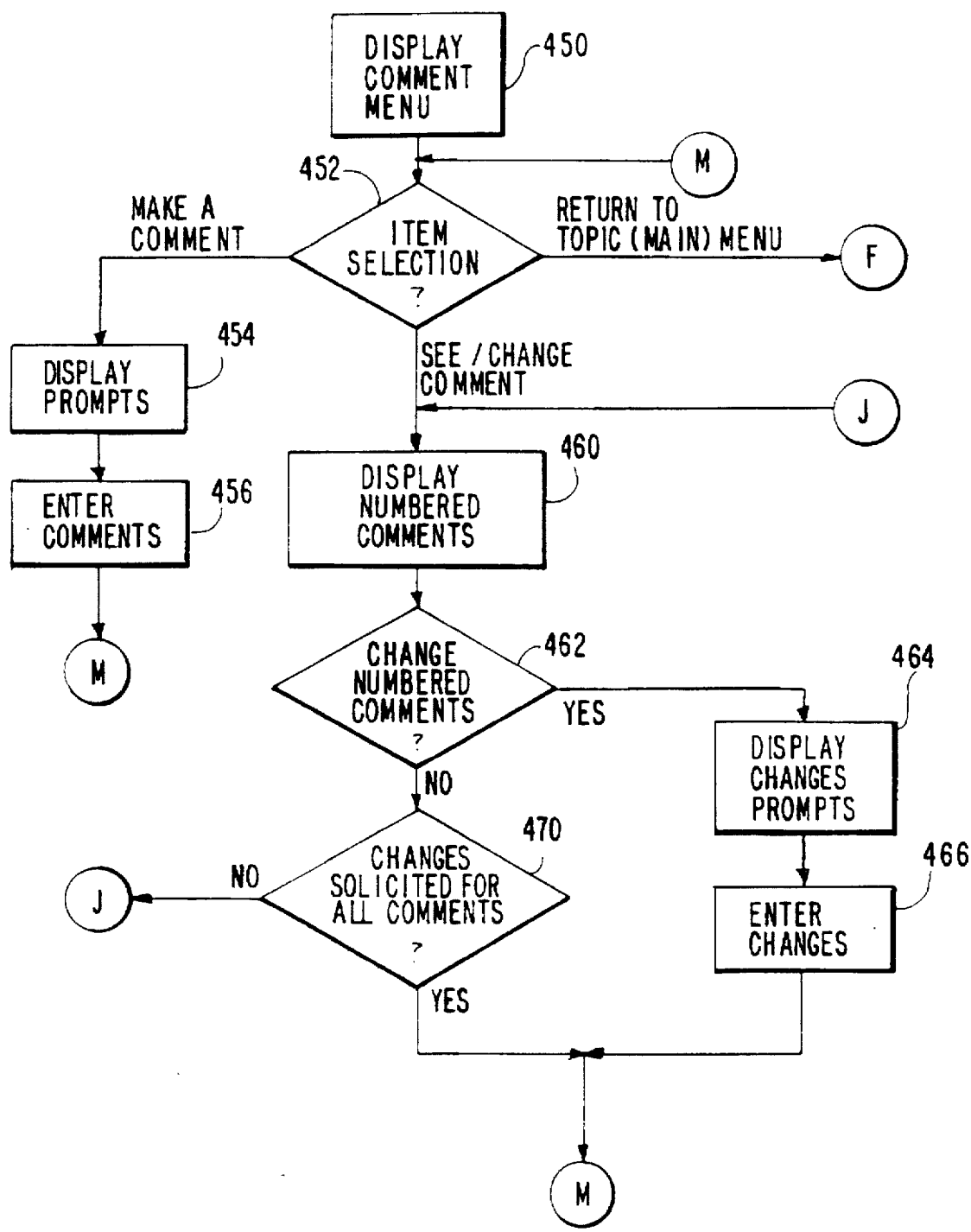
FIG. 9 is a flow chart of a comments program of the self-administered survey device.

Referring now to FIG. 9, the TV/VCR comments program 210 and the radio comments program 224 of FIGS. 5C and 5D are commonly illustrated therein in detail for simplicity and clarity, as the structure of these programs and the types of information displayed are the same. In a step 450, a comment menu is displayed listing items which the respondent may select in order to either make a comment, see or change a prior comment or return to the main menu. The respondent's selection is entered and effected in a step 452. If the respondent chooses to make a comment, appropriate comment prompts indicating the types of information solicited are displayed in a step 454 after which the respondent is given the opportunity to enter his or her comments in a step 456. If, however, the respondent chooses in step 452 to see or change a prior comment, the prior comments are displayed one at time in the order in which entered. Accordingly, the first numbered comment is displayed in a step 460 and the respondent is given the opportunity to interactively determine whether to change the displayed comment. If the respondent chooses to do so, in a step 462, the program branches to a step 464 which provides a prompt to the respondent indicating how the delete "DEL" key 132 may be used to delete prior comments, while the right and left arrow keys 128 and 130 are manipulated in order to move the cursor to select the character to be deleted. The program then proceeds to a step 466 in which the changes selected by the respondent are effected, after which the program returns to the comment menu to permit the selection of a new item. If, however, the respondent chooses not the change a particular displayed comment, the program proceeds to a step 470 where it is determined whether or not changes have been solicited for all of the previously entered comments. If not, the program returns to the step 460 to display the next numbered comment and solicit any desired changes by the respondent. Once the respondent selects to return to the main menu in step 452 the program then branches to step 184 of FIG. 5B.

Figure 10:
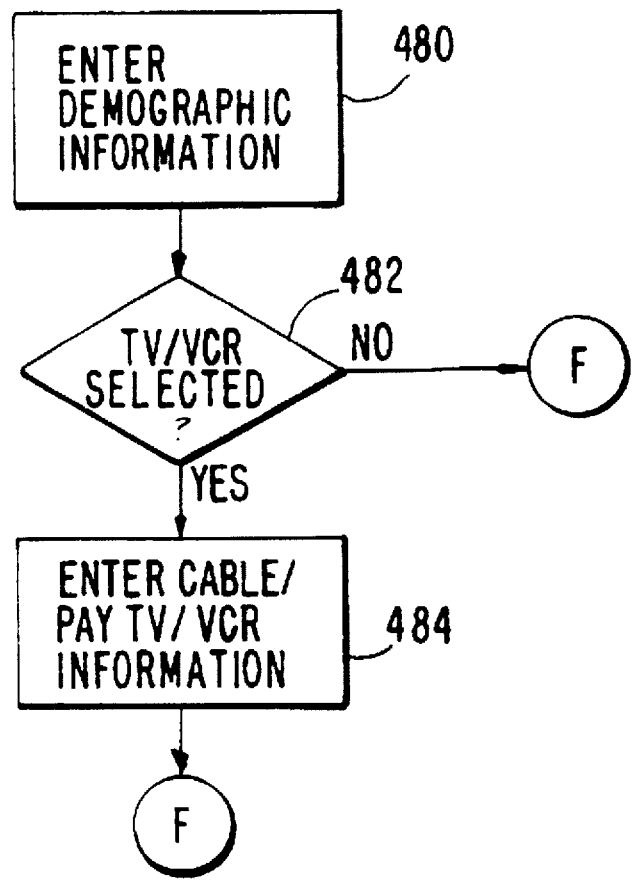
FIG. 10 is a flow chart of a questions program of the self-administered survey device.

Referring now to FIG. 10, the questions program 212 is illustrated therein in detail. Block 480 in FIG. 10 represents a sequence of interactive displays which prompt the respondent to enter demographic information such as age, sex, residence, whether or not the respondent works away from home and the number of hours worked away from home, and the respondent's race and national origin. The microprocessor exercises the supervisory functions of determining whether the age entered consists of two numerals. If not, storage of the entered age is prevented and a prompt is displayed to direct the respondent to reenter the correct age. Thereafter in a step 482 it is determined whether the questions program has been entered after the selection of TV/VCR in the step 184. If not, the program returns to the step 184. If so, a further sequence of interactive prompts are displayed as indicated in program block 484 for determining whether the respondent has cable television service and the extent of such service, as well as whether the respondent owns a VCR, its brand and the types of cable channels (if any) which may be received and recorded by the VCR. Upon completion of the various displays and responses represented by the program block 484, the program returns to the step 184.

Figure 11:
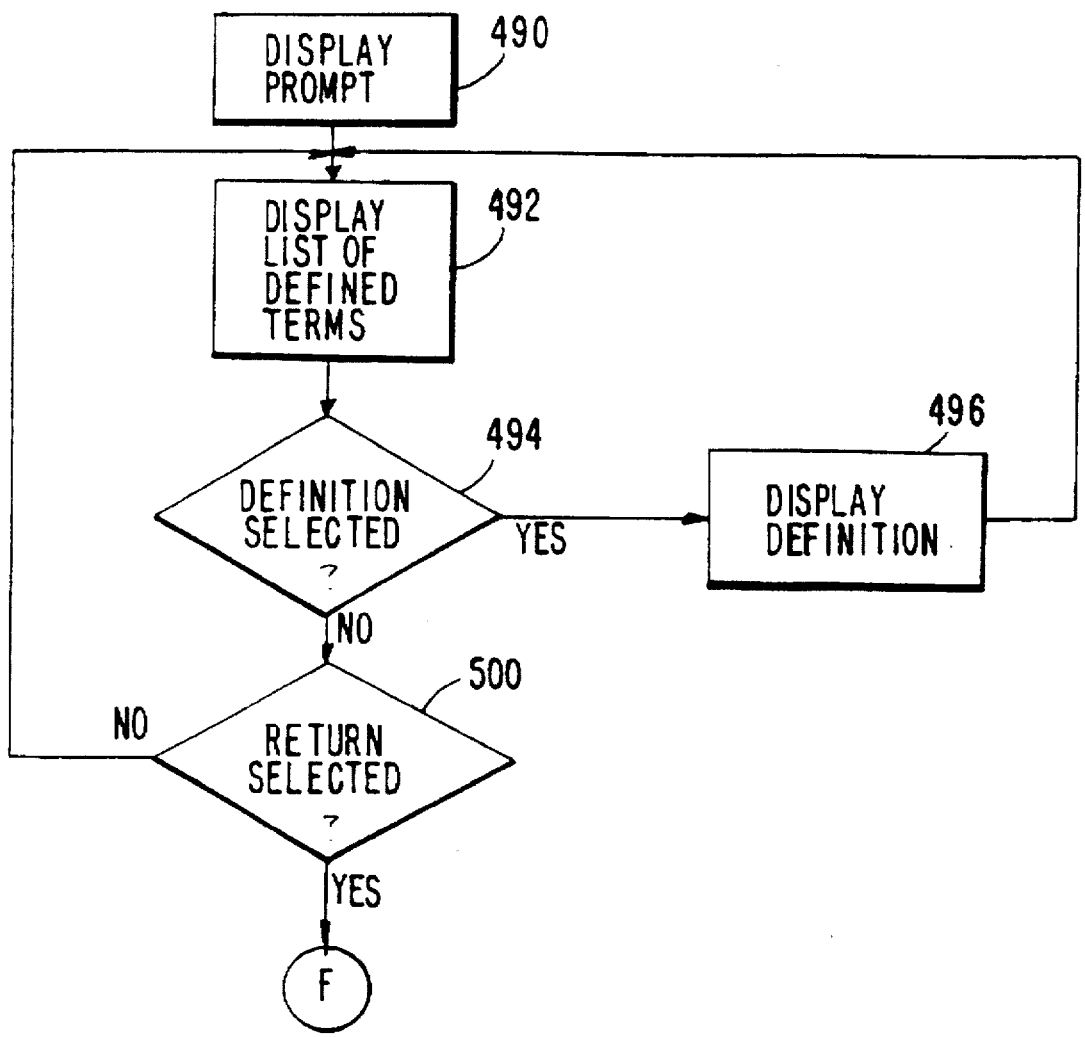
FIG. 11 is a flow chart of a definitions program of the self-administered survey.

The TV/VCR definitions program 214 of FIG. 5C and the radio definitions program 226 of FIG. 5D are commonly illustrated in FIG. 11 for purposes of simplicity and clarity as the structure of these programs is the same and the manner in which the information is displayed in each likewise is the same. Program block 490 represents a sequence of prompts indicating how to access the various definitions included in each program. Thereafter, as indicated by a program block 492, respectively different lists of terms are provided for the TV/VCR program and for the radio program permitting the respondent to select the definition for any of the listed terms. Upon selection of a definition, as indicated in step 494, the definition is displayed (step 496) after which the program proceeds to once again list the defined terms. Also included with this list is a return option which, if selected, as indicated in step 500, returns the program to the step 184 (FIG. 5B).

Figure 12:
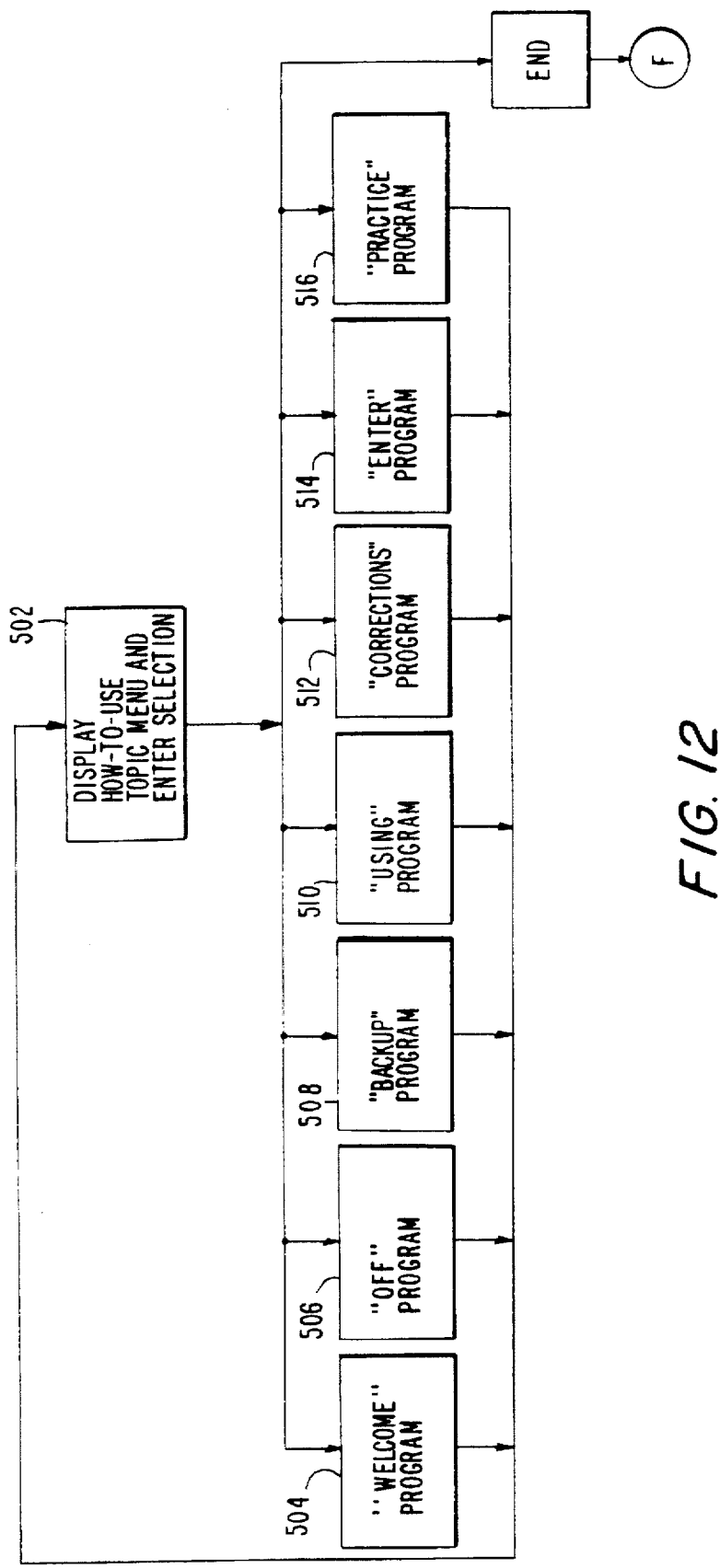
FIG. 12 is a flow chart of a how-to-use program of the self-administered survey device.

The How-to-Use Program 216 of FIGS. 5C and 5D is illustrated in detail in FIG. 12. In a step 502, eight menu items are displayed to permit the respondent to select a desired program, as described below. The first item is a "Welcome" program 504 which, if selected in step 502, provides an introduction to the survey, explaining its purpose and the respondent's role in the survey. If the respondent instead selects an "Off" program 506 the respondent is instead provided with instructions detailing the various ways in which the device 44 may be de-energized or turned "Off" at any time while in an active state. If the respondent instead selects a "Back-up" program 508, the respondent is instructed in the use of the MODE key for backing up the program one-by-one through the previous displayed screens. If instead the "Using" program 510 is selected, the respondent is instructed in the basic steps for entering the password and the purpose of the various subprograms listed in the TV/VCR menu (step 204) and the radio menu (step 218). In addition, the user is provided with basic information regarding how to make data entries as well as how to turn "Off" the device 44. In a "Corrections" program 512 the user is instructed how to correct errors in the data which has been entered by using the DEL key 132 together with the right and left arrow keys 128 and 130. The "Enter" program 514 provides the respondent with information on how to answer all of the various interactive displays. In a still further selection, the respondent may choose a "Practice" program in a step 516 wherein the respondent is enabled to make practice entries in the same form as the entries which are actually made in the TV/VCR entry program of FIG. 6A–6D as well as in the radio entry program of FIG. 7A–7C. The respondent is thus enabled to learn how to make accurate and complete entries in a "hands-on" fashion in order to minimize the likelihood of mistakes in making actual entries thereafter. The final how-to-use menu selection is an "End" selection which returns the program to the step 184.

It will be seen that the present invention provides the capability of carrying out self-administered surveys in a manner which promotes accurate and complete data entries, thus promoting the reliability and usefulness of the results and which is cost effective. It will be appreciated, moreover, that the present invention is broadly applicable for carrying out all manner of self-administered surveys, but is particularly useful for conducting surveys of information media usage, including electronic media such as radio and television (distributed over-the-air, by cable, CATV, satellite or otherwise) and other forms of widely distributed data and information transmission system usage.

It will be appreciated that all or portions of the functions implemented in the device, system and method of the present invention may be carried out either by hardwired circuits or with the use of microprocessors, microcomputers or the like.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. A self-administered survey device, comprising: display means for providing a display of information to a survey respondent; control means for controlling the display means to display at least one event question concerning an event experienced by the respondent; means for producing a real time signal representing real time; input means for entering a response from the respondent to the event question including a time of occurrence of the event; and memory means for storing survey response data entered by the input means; the control means including means for controlling the memory means to store a corresponding response entered by the input means and means for comparing the time of occurrence of the event with the real time signal to determine whether the time of occurrence is a future time and to produce a corresponding future time signal in response to such determination.

2. The self-administered survey device of claim 1, wherein the control means includes means for preventing storage of a response by the memory means for which a corresponding future time signal has been produced.

3. The self-administered survey device of claim 4, wherein the control means includes means for responding to a corresponding future time signal to control the display means to provide an information display to the survey respondent indicating that the entered response concerns a future event.

4. The self-administered survey device of claim 3, wherein the control means includes means for controlling the display means to provide a further display to the survey respondent requesting entry of a proper response to a question for which a previously unacceptable response has been received.

5. The self-administered survey device of claim 1, wherein the control means includes means for preventing entry of a response by the input means for which a corresponding future time signal has been produced.

6. The self-administered survey device of claim 1, wherein the control means includes means for controlling the display means to display at least one question to the respondent concerning the respondent's experiences with an information medium as the at least one event question.

7. The self-administered survey device of claim 6, wherein the control means includes means for controlling the display means to display at least one question to the respondent concerning the respondent's experiences with one of television and radio media as the at least one survey question.

8. The self-administered survey device of claim 6, wherein the control means includes means for preventing storage of a response by the memory means for which a corresponding future event signal has been produced.

9. The self-administered survey device of claim 6, wherein the control means includes means for responding to a corresponding future event signal to control the display means to provide an information display to the survey respondent indicating that the entered response concerns a future event.

10. The self-administered survey device of claim 9, wherein the control means includes means for controlling the display means to provide a further display to the survey respondent requesting re-entry of a proper response to a question for which a previously unacceptable response has been received.

11. The self-administered survey device of claim 6, wherein the control means includes means for preventing entry of a response by the input means for which a corresponding future event signal has been produced.

12. The self-administered survey device of claim 1, wherein the control means includes means for determining whether a response entered by the input means is a complete response to the at least one survey question and for producing a corresponding incomplete response signal upon a determination that the entered response is incomplete.

13. The self-administered survey device of claim 12, wherein the control means includes means for responding to an incomplete response signal to control the display means to provide an information display to the respondent indicating that the response is incomplete.

14. The self-administered survey device of claim 13, wherein the display means includes means for responding to the incomplete response signal to provide a prompt display to the survey respondent requesting entry of a complete response.

15. The self-administered survey device of claim 12, wherein the control means includes means for controlling the display means to display at least one question to the respondent concerning the respondent's experiences with an information medium as the at least one survey question.

16. The self-administered survey device of claim 15, wherein the control means includes means for controlling the display means to display at least one question to the respondent concerning the respondent's experiences with one of television and radio media as the at least one survey question.

17. The self-administered survey device of claim 15, wherein the control means includes means for responding to an incomplete response signal to control the display means to provide an information display to the respondent indicating that the response is incomplete.

18. The self-administered survey device of claim 17, wherein the display means includes means for responding to the incomplete response signal to provide a prompt display to the survey respondent requesting entry of a complete response.

19. The self-administered survey device of claim 1 wherein the control means includes means for controlling the memory means in a first selectable mode of operation to store the response entered by the input means and for controlling the display means in a second selectable mode of operation to display a previously stored response and for controlling the memory means to store a response newly entered by the respondent in place of the previously stored response.

20. The self-administered survey device of claim 19, wherein the control means includes means for controlling the display means to display a menu of operational modes including the first and second modes of operation and for carrying out one of the first and second modes of operation in response to a mode selection signal entered by the respondent with the use of the input means.

21. The self-administered survey device of claim 20, wherein the control means includes means for controlling the display means to display at least one question to the respondent concerning at least one of the respondent's experiences with an information medium as the at least one event question.

22. The self-administered survey device of claim 21, wherein the control means includes means for controlling the display means to display at least one question to the respondent concerning the respondent's experiences with one of television and radio media as the at least one event question.

23. A self-administered survey device, comprising: display means for providing a display of information to a survey respondent; control means for controlling the display means to display to the respondent at least one time-based survey question concerning a possible event occurring within a predetermined survey time period; input means for entering survey response data from the respondent; and memory means for storing survey response data entered by the input means; the control means including means for controlling the memory means to store a corresponding response entered by the input means and means for determining whether a response entered upon the display of the time-based survey question concerns an event occurring prior to the survey time period and to produce a corresponding prior event signal in response to such determination.

24. The self-administered survey device of claim 23, wherein the control means includes means for preventing storage of a response by the memory means for which a corresponding prior event signal has been produced.

25. The self-administered survey device of claim 23, wherein the control means includes means for responding to a corresponding prior event signal to control the display means to provide an information display to the survey respondent indicating that the entered response concerns an event occurring prior to the survey time period.

26. The self-administered survey device of claim 23, wherein the control means includes means for preventing entry of a response by the input means for which a corresponding prior event signal has been produced.

27. A self-administered survey device, comprising: display means for providing a display of information to a survey respondent; control means for controlling the display means to display to the respondent at least one question concerning the respondent's experiences with an information medium within a predetermined survey time period; input means for entering survey response data from the respondent; and memory means for storing survey response data entered by the input means; the control means including means for controlling the memory means to store a response entered by the input means and means for determining whether a response entered upon the display of the time-based survey question concerns an event occurring prior to the survey time period and producing a corresponding prior event signal in response to such determination.

28. The self-administered survey device of claim 27, wherein the control means includes means for preventing storage of a response by the memory means for which a prior event signal has been produced.

29. The self-administered survey device of claim 27, wherein the control means for responding to a corresponding prior event signal to control the display means to provide an information display to the respondent indicating that the entered response concerns an event occurring prior to the survey time period.

30. The self-administered survey device of claim 9, wherein the control means includes means for controlling the display means to provide a further display to the survey respondent requesting re-entry of a proper response to a question for which a previously unacceptable response has been received.

31. The self-administered survey device of claim 27, wherein the control means includes means for preventing entry of a response by the input means for which a prior event signal has been produced.

32. A self-administered survey device, comprising: display means for providing a display of information to a survey respondent; control means for controlling the display means to display a question to the respondent concerning the identity of at least one of television channels viewed thereby and radio stations heard thereby within a predetermined survey time period; input means for entering survey response data from the respondent; and memory means for storing survey response data entered by the input means; the control means including means for controlling the memory means to store a corresponding response entered by the input means; the device further comprising look-up table means for storing identification data representing the identity of at least one of a television channel and a radio station which the survey respondent is able to receive within a predetermined local area, the control means including means for comparing a response received from the respondent representing the identity of a television channel or radio station received thereby with the identification data stored by the look-up table means to determine whether the received response is within the set of predetermined acceptable responses.

33. The self-administered survey device of claim 32, wherein the control means includes means for responding to a determination that a received response is not within the set of predetermined acceptable responses to control the display means to provide a display indicating that the received response is unacceptable.

34. A self-administered survey device, comprising: display means for providing a display of information to a survey respondent; input means for entering survey response data from the survey respondent; memory means for storing survey response data entered by the input means; and control means for controlling the display means to display at least one survey question to the respondent and to control the memory means to store a corresponding response entered by the input means; the control means including means for determining whether a response received by the input means is within a set of predetermined acceptable responses and, upon a determination that an entered response does not fall within the set of predetermined acceptable responses, for producing an unacceptable response signal; the input means including means for entering at least one command from the respondent for directing the operation of the control means; the control means including means for carrying out at least one further control operation in response to the entry of a command after the display of the at least one survey question and in the absence of a response thereto, and after carrying out the at least one further control operation for controlling the display means to provide a prompt display to the survey respondent indicating that the at least one survey question remains unanswered.

35. The self-administered survey device of claim 34, wherein the control means includes means for controlling the display means to display a question to the respondent concerning at least one of the respondent's experiences with an information medium as the at least one survey question.

36. The self-administered survey device of claim 35, wherein the control means includes means for controlling the display means to display a question to the respondent concerning at least one of the respondent's experiences with one of television and radio media as the at least one survey question.

37. A self-administered survey device, comprising: display means for providing a display of information to a survey respondent; input means for entering survey response data from the respondent; memory means for storing survey response data entered by the input means; and control means for controlling the display means in a first mode of operation to display at least one survey question to the respondent regarding the respondent's experiences with an information medium and for controlling the memory means to store a response to the at least one first question entered with the use of the input means, and for controlling the display means in a second mode of operation to display at least one second question regarding demographic data of the respondent and for controlling the memory means to store a response to the at least one second question entered with the use of the input means; the control means including means for changing from the first mode to the second mode upon entry of a mode change signal with the use of the input means and for controlling the display means in the first mode to display a prompt to the respondent to enter the mode change signal in the event that the at least one second question remains unanswered; the control means further including means for determining whether a response received by the input means is within a set of predetermined acceptable responses and, upon a determination that an entered response does not fall within the set of predetermined acceptable responses, to produce an unacceptable response signal.

\* \* \* \* \*